US011090872B2

(12) United States Patent
Koopmans et al.

(10) Patent No.: US 11,090,872 B2
(45) Date of Patent: Aug. 17, 2021

(54) GENERATING ADAPTED CONTROL INSTRUCTIONS FOR A 3D PRINTING PROCESS

(71) Applicant: BOND HIGH PERFORMANCE 3D TECHNOLOGY B.V., Enschede (NL)

(72) Inventors: Nienke Koopmans, Enschede (NL); Alireza Azarfar, Enschede (NL); Thijs Tromper, Enschede (NL)

(73) Assignee: BOND HIGH PERFORMANCE 3D TECHNOLOGY B.V., Enschede (NL)

( * ) Notice: Subject to any disclaimer, the term of this patent is extended or adjusted under 35 U.S.C. 154(b) by 0 days.

(21) Appl. No.: 17/041,518

(22) PCT Filed: Apr. 5, 2019

(86) PCT No.: PCT/EP2019/058621
§ 371 (c)(1),
(2) Date: Sep. 25, 2020

(87) PCT Pub. No.: WO2019/193146
PCT Pub. Date: Oct. 10, 2019

(65) Prior Publication Data
US 2021/0046710 A1  Feb. 18, 2021

(30) Foreign Application Priority Data

Apr. 6, 2018 (EP) .................................. 18166070

(51) Int. Cl.
*B29C 64/393* (2017.01)
*B33Y 50/02* (2015.01)
(Continued)

(52) U.S. Cl.
CPC .......... *B29C 64/393* (2017.08); *B29C 64/106* (2017.08); *B33Y 50/02* (2014.12); *G06F 30/17* (2020.01); *G06F 30/23* (2020.01)

(58) Field of Classification Search
CPC ..... B29C 64/393; B29C 64/106; G06F 30/17; G06F 30/23; B33Y 50/02
See application file for complete search history.

(56) References Cited

U.S. PATENT DOCUMENTS

| | | | |
|---|---|---|---|
| 2015/0352794 A1* | 12/2015 | Nguyen | B22F 3/1055 700/98 |
| 2018/0056595 A1* | 3/2018 | Sterenthal | B33Y 50/02 |
| 2020/0276760 A1* | 9/2020 | Spahr | B29C 64/118 |

FOREIGN PATENT DOCUMENTS

| | | |
|---|---|---|
| EP | 3061546 A1 | 8/2016 |
| EP | 3246831 A1 | 11/2017 |
| JP | 2017077671 A | 4/2017 |

OTHER PUBLICATIONS

Tong, K., et al., Error Compensation for Fused deposition modeling (FDM) machine by correcting slice files, Rapid Prototyping Journal, 2008, vol. 14, No. 1. pp. 4-14, https://doi.org/10.1108/13552540810841517.

(Continued)

*Primary Examiner* — Yuhui R Pan
(74) *Attorney, Agent, or Firm* — Hudak, Shunk & Farine Co. LPA

(57) ABSTRACT

Method and system arranged for obtaining an electronic 3D model of a 3D object to be fabricated. The method further including generating control instructions based on the electronic 3D model and process parameters of the fabrication process, determining a mesh model representing the electronic 3D model, the mesh model including elements each having at least one property that is affectable by at least one of the process parameters, and performing simulation of the fabrication process in time using the control instructions, the mesh model and the process parameters. The simulation includes establishing a deviation of the at least one property relative to a reference thereof for each element of the mesh (Continued)

model, wherein the deviation is induced by at least one of the process parameters, and establishing an adaptation for the at least one property of each element of the mesh model to compensate for the deviation. The adaptation is applied to the process of generating control instructions to obtain at least one adapted control instruction.

19 Claims, 8 Drawing Sheets

(51) Int. Cl.
*B29C 64/106* (2017.01)
*G06F 30/23* (2020.01)
*G06F 30/17* (2020.01)

(56) References Cited

OTHER PUBLICATIONS

Cheng, L., et al., A prediction and compensation scheme for in-plane shape deviation of additive manufacturing with information on process parameters, IISE Transactions, 2018, vol. 50, No. 5, pp. 394-406, Taylor & Francis Group, https://doi.org/10.1080/24725854.2017.1402224.

* cited by examiner

GENERATING ADAPTED CONTROL INSTRUCTIONS FOR A 3D PRINTING PROCESS

FIELD OF THE INVENTION

The invention relates to a method for generating adapted control instructions for a fabrication process of a 3D object using a material extrusion (ME) process for 3D printing. The invention further relates to a fabrication process of a 3D object using a 3D printing ME process. The invention further relates to a system for generating adapted control instructions for a fabrication process of a 3D object using a 3D printing ME process. The invention further relates to a system for fabrication of a 3D object using a 3D printing ME process.

BACKGROUND OF THE INVENTION

In 3D modeling, more specifically in 3D printing by material extrusion (ME), objects are formed by layering modeling material in a controlled manner such that a desired three-dimensionally shaped object can be created. Very often for three-dimensional modeling a three-dimensional modeling printer is used. The printer has a three dimensionally moveable printhead which dispenses the modeling material, while the printhead is moved over previously deposited tracks of the modeling material.

The object to be manufactured can be placed on a base. The printhead is movable in a three-dimensional space relative to the object being modeled or printed. In some cases, the object is movable in one or more dimensions relative to the printhead. Various options are available for moving the base on which the object is modeled and the printhead relative to each other.

The motions of the printhead are controlled by a control system which controls a controllable positioning system to which the printhead is attached. By means of software a pattern of tracks can be generated, which pattern is used for moving the printhead and for depositing the tracks.

The object is created on a base in a reference location relative to the movable printhead. The modeling material can be fused with previously formed tracks. The three-dimensional modeling material can be fed in the printhead in the form of for example filament, granulate, rod, liquid, resin or a suspension.

The modeling material, further referred to as feedstock material, is dispensed from the printhead through a nozzle and is deposited on the base in the form of tracks forming a layer of tracks, or when a previous layer of the object to be created has been deposited, on previously deposited tracks where it is allowed to solidify. The modeling material can be thermally or chemically or otherwise fused with the previously deposited tracks.

The relative motion of the base and object to the printhead along tracks and simultaneous deposition of modeling material from the printhead allow the fused deposition modeled object to grow with each deposited track and gradually attains its desired shape.

When producing objects from molten polymers using 3D printing using a ME process, the density of the material increases with decreasing temperature. Therefore, the object shrinks. This is more paramount for semi-crystalline polymers which possess a higher percentage of shrinkage.

If the ME process is fast in relation to the temperature decrease, the shrinkage can be mainly homogenous and can be compensated for by producing the object a certain percentage larger. Injection molding production processes in the art, wherein an object is molded in an instant, approximate this kind of behavior.

When producing an object using a ME process at extremely low speed, the ME feedstock coming from the nozzle will shrink as it cools down immediately after deposition. This implies that each modeling material track or road can be printed slightly larger than actually required by the object dimensions. After cooling down, the shape of the final product will then approximate the shape from the 3D-model.

When ME technology is used at realistic speeds however, the printing time of a layer is unfavorable compared to the thermal time constant of the cooling down process. The exterior of the object to be manufactured cools down faster than the inside. This causes heat to be trapped inside the printed object. Thereby shrinkage of the object's exterior evolves faster than shrinkage of the object's inside.

This may cause internal mechanical stresses and deformation of the printed object. Thereby inaccurate object shapes may be obtained. As the deposited material cools down, the heat is released through the top and the side surfaces of the object. Therefore, heat flows from the area which is printed to the side walls, causing isotherms. This implies that the core of the object remains warmer than the sides. This causes top surfaces which would normally be flat to be curved. Possible failure during printing may occur when due to the shrinkage and subsequent curving a gap between an object to be manufactured and a print head by which the object is printed becomes too large or too small.

When manufacturing an object by applying a chemical feedstock material such as resins and subsequently curing them, both heat generation, and expansion or shrinkage of the feedstock material while curing may cause deformation of the object, relative to the electronic 3D model.

More in general, during the ME process certain ME process parameters of the ME feedstock material, such as temperature, density, may change locally or globally within the object to be manufactured. These process parameters may also change during the process in time. This change may affect mechanical properties of the 3D object to be manufactured. An example of such mechanical property is object dimensions. Not only dimensions of the 3D object may change however during the ME process. Other mechanical properties such as Young modulus, density, etc. may also change during the ME process as a consequence of the process parameters which change during the ME process.

Taking temperature as an example of a ME process parameter and object dimensions as an example of a property of the 3D object, deformation of the 3D object may occur as described. Deformation of the 3D object may appear as at least one of shrinkage and warpage. Such deformation may lead to further consequences within the ME process. For example, due to shrinkage as a consequence of temperature change during the ME process, a gap between the nozzle and the previously deposited feedstock material may change unexpectedly. This may result in further deviations in the actually manufactured 3D object and its mechanical properties in comparison with the result that was expected based on 3D model.

Such deformations and deviations may be compensated.

In compensation methods known in the art of Fused Deposition Modeling (FDM), shrinkage due to temperature change may be compensated by applying compensation to the outer surfaces of the intended shape designated by the electronic 3D model. So, by enlarging the electronic 3D model shrinkage can be compensated for, however changes in the abovementioned gap between nozzle and 3D object during printing is not compensated for. Global enlargement of the 3D object may compensate for global dimension deformation. However, parts of the 3D object may deform and lose their intended shape upon cooling down of the 3D object after manufacturing.

Also, local compensation of the electronic 3D model can be applied. For example, an intended flat horizontal surface, which during manufacturing may exhibit a local recess in the actually manufactured 3D object after cooling down, may be compensated by depositing one or more extra layers of ME feedstock material at the location where, after cooling down, the recess was anticipated. Results of this approach however may cause outer object surfaces to be rough due to dithering issues as a result of the deposition of additional compensation layers.

Fabrication processes of a 3D object using a 3D printing ME process may further comprise a post-processing process. Such post-processing process may relate to annealing of the 3D object. Annealing the 3D object allows residual stress within the object to be reduced. In the art, annealing is performed by generating control instructions for controlling annealing time and temperature profile in an annealing oven, independent of the 3D object. Optimization of this post-processing, i.e. annealing, in the art may constitute a manual operation, as the post-processing is an open-loop process, wherein the resulting residual stress is unknown.

SUMMARY OF THE INVENTION

It is an object of the invention to overcome the above stated problems and disadvantages related to compensation methods known in the art of FDM. The object is achieved by a method for generating adapted control instructions for a fabrication process of a 3D object using a material extrusion (ME) process for 3D printing in accordance with claim 1.

The method, comprises obtaining an electronic 3D model of the 3D object to be fabricated. The method further comprises generating control instructions based on said electronic 3D model and process parameters of said fabrication process, determining a mesh model representing said electronic 3D model, the mesh model comprising elements each having at least one property that is affectable by at least one of said process parameters, and performing simulation of said fabrication process in time using said control instructions, said mesh model and said process parameters. The simulation comprises establishing a deviation of said at least one property relative to a reference thereof for each element of the mesh model, wherein said deviation is induced by at least one of said process parameters, and establishing an adaptation for said at least one property of said each element of the mesh model to compensate for said deviation. Said adaptation is applied to said control instructions to obtain at least one adapted control instruction.

The adapted control instructions allow fabrication of 3D objects that remain accurate to the electronic 3D model after at least one of cooling down to room temperature at the end of the fabrication process and during use of the printed 3D object in accordance with the specifications for use. Simulation of the fabrication process according to the invention allows predicting properties of the 3D object to be printed and deviations thereof when compared to a reference. The at least one property of each of the elements of the mesh model can be associated with at least one physical property of the 3D object. Examples of such physical properties are object deformation and mechanical stress.

The at least one property of each of the elements of the mesh model is affectable by a process parameter of said fabrication process, such as a temperature which is set to a predetermined value for performing the fabrication process. The process parameter is used in the simulation and the effect of the process parameter on the mesh model of the electronic 3D model can be established. Other parameters that may be used in the simulation may include at least one of a group of parameters comprising processing time, printhead speed, nozzle temperature, nozzle diameter, print track width, layer thickness, extrusion speed, build chamber temperature, gravity, build plate tilt, build chamber air flow, deposition material curing speed, curing heat production rate, etcetera.

In the simulation not only single properties, but also combinations of mathematically linked properties can be used for which deviations from a reference can be determined. When for example the simulation is performed using temperature as process parameter, the temperature behavior of the 3D object to be printed may be simulated in the mesh model, including cooling down of the 3D object. Cooling down may cause shrinkage, i.e. object dimensions may deviate from the reference determined by the electronic 3D model, Shrinkage however also causes residual stress within the 3D object, which is derivable from the object dimensions deviations. Other properties of the mesh model elements affectable by a process parameter that can be simulated for optimization, may for example include at least one of and not limited to a group of properties comprising creep, elasticity, visco-elasticity, isotropy, tensile strength, yield strength, heat capacity, roughness of horizontal outer surfaces, crystallization degree, printing time, post processing time, cost, and combinations thereof.

From the deviation of the at least one property an adaptation can be derived for the simulated property to compensate for the deviation. Based on the established adaptation for the property, e.g. object dimensions and shrinkage, the control instructions can be adapted to obtain at least one adapted control instruction that enables at least partial compensation for the deviation predicted by the simulation. In this way the fabrication process can be optimized. For example, the at least one adapted control instruction may include an instruction to fabricate the 3D object initially larger than projected to allow the 3D object to shrink to its nominal dimensions upon cooling down.

Thus, local and time dependent shrinkage of the material during the printing process can be corrected, with the goal to reduce the risk of faulty parts and improving the accuracy of the printed shape, Other things that can be optimized are the residual stress inside the printed part or the existence and shape of a temporary support structure.

In an embodiment, the generating control instructions comprises generating at least one electronic toolpath, comprising generating at least one deposition sequence of feedstock material for said ME process based on said electronic 3D model, determining at least one electronic slice representing a layer of the 3D object to be manufactured, determining at least one electronic toolpath for each of the at least one electronic slice, The determining the at least one electronic slice and the determining the at least one electronic toolpath is performed according to said deposition sequence.

The steps within this embodiment are generally referred to as slicing, which can be performed using so-called slicer software. The slicing refers to the ME process for which the electronic toolpaths are generated to control a 3D printer to enable the deposition of feedstock material in tracks or roads that lie within layers corresponding to the generated electronic slices.

The deposition sequence determines how the slicer software generates electronic slices and toolpaths from the electronic 3D model of the 3D object. Usually the deposition sequence is bottom-up, wherein electronic slices are generated starting at a projected bottom side of the 3D object. Subsequent electronic slices are generated on top of a previously generated electronic slice.

Within each electronic slice one or more islands may occur depending on substructures of the 3D object within the electronic 3D model, wherein each island represents a cross section within the electronic slice of the corresponding substructure.

From the islands within the electronic slice, the electronic toolpaths can be generated. The slicer software can be influenced, e.g. by mathematically spatially morphing of electronic slices, and spatially adapting the toolpaths.

In an embodiment, the performing simulation of said fabrication process in time comprises simulation of the ME process, comprises determining at least one activation sequence of the elements of the mesh model corresponding to said at least one deposition sequence, and performing said simulation of said ME process in accordance with said activation sequence to obtain a ME simulation result.

During the simulation of the mesh model, the mesh elements can be activated according to the activation sequence. The activation sequence involves including mesh elements in active participation in the simulation, whilst before activating, the mesh elements do not participate in the simulation. The mesh model allows finite elements methods for analysis and simulation of the electronic 3D model during the ME process. The activation sequence of elements of the mesh model corresponding to the deposition sequence of the at least one electronic toolpath allows the simulation to be performed on a time-basis which corresponds to the order in which the 3D object is to be manufactured during the ME process.

In an embodiment, said determining an activation sequence comprises one of spatially mapping said at least one electronic toolpath on elements of the mesh model and spatially mapping the at least one electronic slice on elements of the mesh model.

As the deposition sequence is used in the generating the electronic toolpaths, the activation sequence may follow the generation of electronic slices or the generation of electronic toolpaths.

In an embodiment, the generating at least one deposition sequence comprises generating a plurality of mutually different deposition sequences, and wherein the performing said simulation of the ME process comprises: repeating until said deviation is below a first predetermined threshold said generating at least one electronic toolpath, using for each repetition one of the plurality of mutually different deposition sequences, and said simulation of the ME process using for each repetition an activation sequence corresponding to said one respective deposition sequence.

Upon establishing said deviation being below said first predetermined threshold, selecting said one respective deposition sequence to obtain a preferred deposition sequence.

This way an optimal deposition sequence from a group of deposition sequences can be established, wherein the deviation for the at least one property complies with a certain criterium. So, for example an optimal fit in object dimensions, or a minimum of residual mechanical stress can be determined.

In an embodiment, said performing simulation of said fabrication process in time comprises using at least one coefficient indicating a relationship between at least one of said process parameters and the at least one property. Examples of such coefficients are thermal expansion coefficient, Youngs modulus, thermal conductivity, viscosity index, heat transfer coefficient, specific heat capacity, Poisson ratio, convection coefficient, melt temperature, reaction rate constant, etcetera.

In an embodiment, said at least one coefficient is at least one of time dependent, anisotropic, and temperature dependent.

The simulation and compensation can be carried out by approximating material properties i.e. coefficients by assuming constant values during the printing process. In reality, properties such as Youngs modulus, coefficient of thermal expansion, viscosity, thermal conductivity, specific heat capacity are a function of the temperature. Especially when printing semi-crystalline materials, the temperature dependency can be non-linear. Polymers are also known to have strong time dependent behavior, such as visco-elasticity, more specifically creep or stress relaxation. The temperature at which the material crystallizes is also depending on the cooling rate (i.e. speed of cooling down).

As a polymer is extruded, shear may occur in the nozzle which causes alignment of the molecules along the flow. Therefore, material properties such as the coefficient of thermal expansion, the Youngs modulus and the thermal conductivity, among others, may have a different value along the printing direction than perpendicular to the printing direction. The compensation will be more accurate if one or more of these dependencies are taken into account in the model.

In an embodiment, the determining an adaptation for said at least one property for each element of the mesh model based on said deviation comprises: for each element of the mesh model determining said adaptation by performing one of sign reversing said deviation, and one of sign reversing said at least one coefficient and inverting said at least one coefficient.

When for example a spatial deviation, e.g. a deformation is found, a compensation may be found by reversing the deformation.

A deformation vector field may for example be determined in the mesh model during simulation. By (sign) reversing the deformation vector field, a compensation vector field may be determined in the mesh model, which may for example entail a spatial compensation for shrinkage during the ME process.

In case of the deformation vector field as outlined above, an alternative way of obtaining the compensation vector field is by sign reversing the coefficient of thermal expansion, and then directly derive the deformation of each element in the simulation while it is printed. If for instance the sign reversed value of the coefficient of thermal expansion is used in the simulation, the object appears to grow as it cools down, which directly results in a compensation vector field.

One of the at least one properties may not be linearly linked to the ME process parameter using a coefficient. A compensation for a deviation of a property of elements of the mesh model may alternatively be determined by inverting the coefficient, which entails using the reciprocal value of the coefficient. This may effectively compensate for said deviation.

Another approach for determining the adaptation involves storing simulation results for said performing said simulation of the ME process using said activation sequence in reverse order and using said stored simulation results and assigning said deviation resulting from said simulation in reverse order to said adaptation.

When for example thermal expansion during 3D printing and shrink during cooldown may be simulated in reverse order. The mechanical mesh model will initially (i.e. after printing, annealing and final cool-down) have the intended shape and will expand as the temperature is elevated when the simulation is going backwards in time. So adapting the control instructions to create the 3D object using the expansion of dimensions under the elevated temperature during printing, the object will shrink to its intended shape after cooling down.

In an embodiment, the reference comprises 3D dimensions of the electronic 3D model and the deviation comprises a spatial deformation of the 3D dimensions of the mesh model relative to the 3D dimensions of the electronic 3D model, and wherein for each element of the mesh model said adaptation comprises a spatial compensation. The applying said adaptation to the generating control instructions comprises applying said spatial compensation to said at least one electronic toolpath to obtain at least one spatially compensated electronic toolpath, and establishing said at least one adapted control instruction comprising said at least one spatially compensated electronic toolpath.

The spatially compensated electronic toolpaths following from the applying the spatial compensation to the electronic toolpaths allows the 3D object to be fabricated such that the shape of the 3D object accurately matches the shape of the electronic 3D model by taking into account deformations as a result of for example shrinkage after cooling down, or stress relaxation of the printed material, or expansion after the ME process is completed. This embodiment has an advantage in that the simulation predicts the printing process more accurately in that the heat is more precisely modeled in place and time.

In an embodiment, the applying said spatial compensation to said at least one electronic toolpath comprises applying a coordinate transformation using said ME simulation result to each of said at least one electronic toolpath.

Once an electronic toolpath is generated, the coordinate transformation following from the spatial compensation may be applied to the electronic toolpath to obtain the adapted electronic toolpath. This way spatially curved toolpaths may be followed in the actual ME process for 3D printing, which allows deposition of feedstock material in spatially curved tracks. The electronic toolpaths may become adapted in three dimensions, and will therefore more accurately follow the top surface of the object being printed while it is not yet flat due to local deformations.

Compensating the electronic toolpaths, in contrast to just compensating the outer surface of the object, and enabling them to become curved three-dimensionally, takes into account local shrink in vertical direction and helps to ensure all print tracks are printed at an accurate thickness. This assures constant pressure independent of local heat build-up and generally increases reliability of the process.

Moreover, allowing the print paths to be curved ensures the roughness of horizontal outer surfaces is not increased by dithering issues In an alternative embodiment, the applying said spatial compensation to said at least one electronic toolpath comprises applying a coordinate transformation using said ME simulation result to each of the at least one electronic slice to obtain at least one spatially compensated electronic slice, and performing said determining at least one electronic toolpath using each of said at least one spatially compensated electronic slice.

According to this embodiment of the method according to the invention, first spatially compensated slices are determined from which spatially compensated toolpaths can be generated using the step of determining at least one electronic toolpath.

In an embodiment, the generating control instructions comprises: generating at least one group of optional electronic toolpaths that are activatable and deactivatable, and wherein the performing said simulation of the ME process comprises: for each group of said at least one group of optional electronic toolpaths: deactivating said respective group of optional electronic toolpaths to obtain a deactivated respective group, performing simulation of the ME process, and establishing whether said deviation of said simulation of the ME process is higher than a second predetermined threshold.

Upon establishing that said deviation is higher than said second predetermined threshold, activating said deactivated respective group.

A group of optional electronic toolpaths may relate to one special feature of the 3D object to be printed such as a support structure. Such support structure may be deposited using a feedstock material that is different from the feedstock material from which the 3D object is fabricated. The feedstock material for the support structure is preferably removable, e.g. by using soluble material, more specifically by using water-soluble material, or by printing a breakaway support and breaking it off. The support structure prevents features of a 3D object from collapsing during the ME process. When the fabrication process is finished the support structure can be removed.

An example of a feature requiring a support structure may be a horizontal beam which is at one end attached to the main body of the 3D object, wherein the opposite end extends freely into space.

While encountering such a feature of the 3D object in the electronic 3D model, the generating control instructions based on said 3D model can be arranged to generate a group of optional electronic toolpaths for said support structure. By de-activating the group of optional electronic toolpaths relating to a support structure a simulation can be performed using the deactivated toolpaths. When the simulation is successful, and a simulation result is established wherein the deviation of the simulation of the ME process is below the second threshold, the optional electronic toolpaths relating to the support structure may remain deactivated. In this case, the support structure is apparently not required and a 3D object within specification can be achieved without using them.

If, however the deviation established during the simulation of the ME process exceeds the second threshold, no 3D object within specification can be achieved without the use of the support structure, and the optional electronic toolpaths relating to the support structure are re-activated, to allow use of the support structure during the fabrication process.

Thus, the advantage is that less support material is needed (i.e. less consumption of support material, less time to print the object, and less post processing costs).

In an embodiment, said simulation of the ME process comprises thermo-mechanical simulation using a finite element method.

This allows simulation using finite element methods (FEM) of mechanical properties of the 3D object which are affected by mechanical and thermal properties.

In an embodiment, said fabrication process further comprises a post-processing process following the ME process, and wherein said generating control instructions based on said electronic 3D-model and process parameters of said fabrication process comprises: generating post-processing control instructions for said post-processing process; and wherein said performing simulation of said fabrication process in time further comprises: performing simulation of said post-processing process using the ME simulation result and using said post-processing control instructions.

This allows the fabrication process to encompass more than just the ME process of feedstock material deposition. Post-processing may also be simulated especially where the post-processing affects the outcome of the fabrication process.

In an embodiment, said post-processing control instructions comprise annealing process instructions. Annealing involves exposing the 3D object to a temperature profile in time, which profile may be set by the post-processing control instructions, i.e. annealing process control instructions. Moreover, timing of said annealing process may be set by said annealing process control instructions.

Using the simulation of the mesh model using the annealing process control instructions, any deviations due to for example residual stress can be reduced. Preferably overall residual stress within the printed 3D object is as low as possible.

In an embodiment, the performing simulation of said post-processing process comprises establishing a plurality of mutually different sets of post-processing instructions, and repeating until said deviation is below a third predetermined threshold: performing said simulation of the post-processing process using for each repetition one set of said plurality of mutually different sets of post-processing instructions, and upon establishing said deviation being below said third predetermined threshold, selecting said one respective set of post-processing instructions to obtain a preferred set of post-processing instructions, and establishing said at least one adapted control instruction comprising said preferred set of post-processing instructions.

This allows obtaining an optimized preferred set of post-processing control instructions by using different sets of control instructions and determining which set gives an optimal result wherein the deviation of the required property is optimized, i.e. is below the third predetermined threshold.

In an embodiment, said performing simulation of said fabrication process in time comprises: until said deviation of said at least one property is less than or equal to a fourth predetermined threshold, performing said simulation of said fabrication process in at least one iteration cycle, using said adapted control instructions from a preceding simulation, and applying said adaptation from said iteration cycle to said control instructions.

This allows an optimal result to be achieved using iteration. The initial control instructions result in adapted control instructions by using the simulation result and applying the simulation result to the control instructions. In this way adapted control instructions can be achieved when the deviation of the at least one property is below the fourth predetermined threshold.

By using the adapted control instructions to go through the simulation cycle again and applying the simulation result to the previously adapted control instructions, to obtain new adapted control instructions, optimized adapted control instructions can be obtained. This can apply to both ME process control instructions and post-processing control instructions.

According to another aspect, the object of the invention is also achieved by a fabrication process of a 3D object using a 3D printing material extrusion (ME) process, comprising using at least one adapted control instruction obtained using the method as described above.

This allows compensation of the fabrication process by taking into account deviations caused by process parameters which deviations would otherwise require adaptation of the electronic 3D model of the 3D object to be fabricated.

According to another aspect, the object of the invention is achieved by a system for generating adapted control instructions for a fabrication process of a 3D object using a 3D printing material extrusion (ME) process, comprising a processor that is provided with a memory and program instructions, wherein the processor is arranged for performing any one of the steps according to the method set out above.

This allows the method according to the invention to be performed in e.g. a computer system which can be dedicated for generating the adapted control instructions wherein said adaptation is based on a simulation of the fabrication process.

According to yet another aspect, the object of the invention is achieved by a system for fabrication of a 3D object using a 3D printing material extrusion (ME) process, the system comprising at least one printhead for depositing feedstock material to create the 3D-object, a positioning system connected to said printhead, wherein said positioning system is arranged to position said printhead relative to said 3D-object.

The system further comprises a controller arranged to obtain control instructions and control the positioning system using said control instructions.

The system further comprises a system for generating adapted control instructions for a fabrication process of a 3D object using a 3D printing material extrusion (ME) process as described above, wherein the controller is arranged to obtain adapted control instructions from said system for generating adapted control instructions.

DETAILED DESCRIPTION OF EMBODIMENTS

Figure 1A:
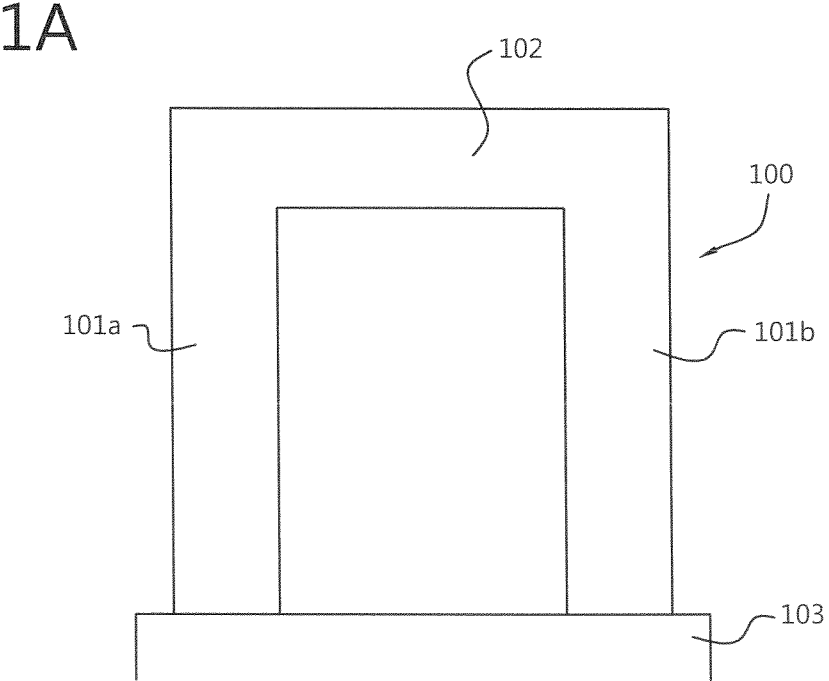
FIG. 1A shows a two-dimensional (2D) representation of a 3D model of an exemplary 3D object to be manufactured according to the state of the art.

FIG. 1A shows a two-dimensional (2D) representation of a 3D model of an exemplary 3D object 100 to be manufactured. The 3D object 100 has two upright columns 101$a$, 101$b$ placed on a base 103, and a crossbar 102 across the tops of the columns. The object 100 can be manufactured according to the state of the art using a 3D printing system using material extrusion (ME).

The ME process according to the state of the art follows the shape of the object 100. When manufactured using the ME system, the printhead is controlled such that it deposits the feedstock material according to electronic toolpaths which in the art are generated using a so-called slicer software tool, wherein a 3D model of the 3D object 100 is translated into slices, i.e. defining layers bottom up of the 3D object, which slices are used to generate electronic toolpaths enabling the ME system to complete the 3D object 100 to be manufactured. When using for example Fused Deposition Modeling (FDM) techniques to manufacture the 3D object 100, ME feedstock material is deposited in layers by a printhead of the ME system at high temperatures in a molten state to allow it to fuse with previously deposited layers.

During the ME process, shrinkage of the 3D object will occur while the deposition is in progress and when the deposition process is completed. During and after the deposition, earlier deposited parts of the 3D object will cool down and while temperature within these parts decreases, shrinkage will occur as a result. The 3D object will deform depending on the time it takes to manufacture the 3D object and material properties of the ME feedstock material, such as Young's modulus, heat capacity, surface area exposed to the lower temperature environment, feedstock melt temperature $T_m$, etc. As a result, a deformed object 104 is formed as is shown in FIG. 1B.

Figure 1B:
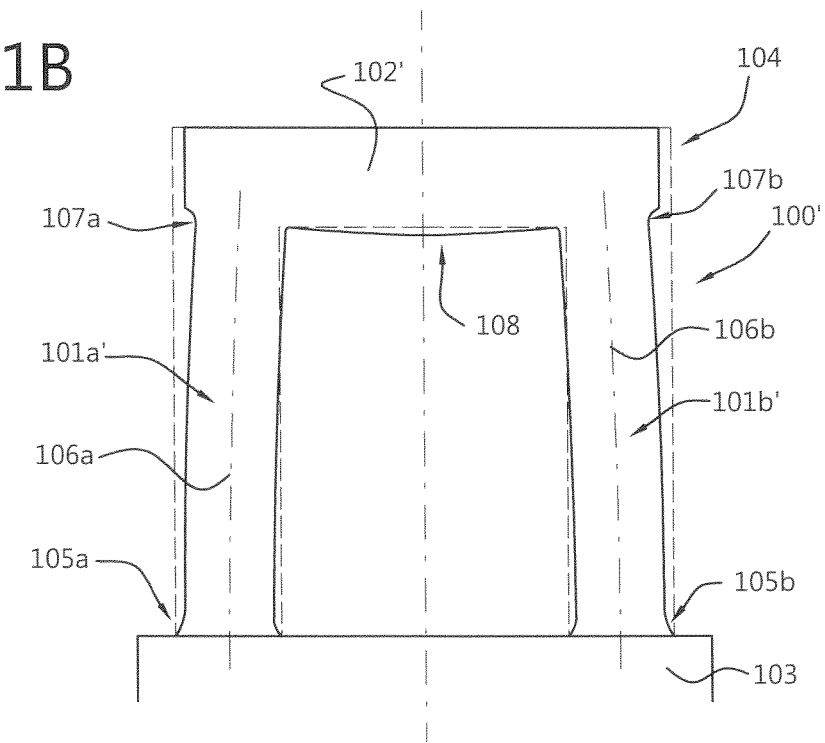
FIG. 1B shows a schematic comparison of a cross-section of a 3D object fabricated in accordance with a 3D printing process known in the art and the 2D representation of the 3D model shown in FIG. 1A.

FIG. 1B shows a deformed object 104 when the ME process is finished after cooling down, where the intended shape of the object is shown by the dashed line 100' in FIG. 1B. Initially, both columns 101$a$', 101$b$' are shown shrunk with respect to their intended shape 101$a$, 101$b$ of FIG. 1A. At the base 103, both columns 101$a$', 101$b$' get an individual 'elephant foot' 105$a$, 105$b$.

As the columns 101$a$', 101$b$' are joined by the cross beam 102', they will be pulled together due to shrinkage of the layers forming the cross beam 102'. From now on, the object will shrink around a common thermal centerline rather than around individual thermal centerlines 106$a$, 106$b$ of the columns 101$a$', 101$b$'. The centerlines 106$a$, 106$b$ are shown inclined towards each other.

The initially deposited layers of the cross beam 102' can cool down relatively fast. These initial layers may have already shrunk as new cross beam layers are deposited. The new crossbeam layers contract after being deposited, causing bending of the cross beam 102', shown by the convex deformed shape 108. When following the original horizontal path as planned by the slicing software, a gap between the nozzle of the printhead and the 3D object could become too small or too large, causing under- or over-extrusion of the feedstock material and ultimately failure of the print job.

As cross beam 102' becomes thicker during the ME process, the ability to deform the subsequent layers of the cross beam 102' decreases. Therefore, the width of the cross beam 102' is slightly smaller than expected based on the intended shape 100. Moreover, deformations such as indentations 107$a$, 107$b$ may occur as a result of uneven shrinkage of the columns 101$a$', 101$b$'.

As described, when fabricating a 3D object using an ME system, e.g. a 3D printer, ME feedstock material is deposited in tracks by a printhead of the ME system, wherein the tracks are arranged in layers. By fusing the tracks with previously deposited layers, a 3D object can be obtained.

Each track of ME feedstock material requires an electronic toolpath along which the printhead of the ME system will move to deposit the feedstock material. For the ME system, control instructions can be generated using a so-called slicer, or slicer software. The slicer generates control instructions in the form of electronic slices, i.e. data objects representing a layer of the 3D model, having a predetermined thickness which allow the ME system to deposit the ME feedstock material in corresponding layers. The slices can be generated from bottom-up allowing a first layer of ME feedstock material to be deposited on a base, and successive layers to be deposited on top of each other. As most ME systems in the art cannot deposit layers in a single action, each electronic slice can be used to generate the electronic toolpaths corresponding to a trajectory in space along which a printhead of the ME system has to move to deposit the ME feedstock material in the proper places to actually fabricate the 3D object that was described in the electronic 3D model.

An electronic toolpath can be defined as a data item representing a spatial starting point $X_0=(x_0, y_0, z_0)$ and a spatial end point $X_1=(x_1, y_1, z_1)$, and a trajectory between the starting point and the end point. Along the trajectory a ME feedstock material quantity E is to be deposited. The deposition rate along the electronic toolpath trajectory may be a function of a pathlength s traveled along the trajectory. In the trajectory the deposition rate can be indicated by dE/ds for the ME printhead when it moves along the trajectory from the starting point to the end point. However, the deposition rate may also be a function of the spatial coordinates while traveling along the trajectory. Moreover, the deposition rate may be a function of time while traveling along the trajectory indicated by dE/dt. The deposition rate may further be a combination of the preceding functions of time, path length, and spatial coordinates. The deposition rate dE/ds or dE/dt is greater than zero while performing the deposition of ME feedstock material.

An electronic toolpath according to this definition can be implemented as a data object which can be processed by a controller or processor used in association with the ME system. An electronic toolpath in this application is limited to the trajectory along which the printhead is to deposit the ME feedstock material on the 3D object to be manufactured, so along a spatial trajectory wherein dE/ds or dE/dt are non-zero. Travel trajectories of the printhead outside the electronic toolpath are not considered in this application, however travel times are included in the simulation, as these may have impact on the simulation result.

In this application, it is assumed that an electronic toolpath has a single trajectory for the sake of simplicity. It may be contemplated however to include multiple trajectories each having a starting point and end point in the electronic toolpath definition without deviating from the teaching of the invention as described. Moreover, an electronic toolpath may be defined by a loop shaped trajectory having an overlapping starting point and end point.

The trajectory can be mathematically described by means of for example a polynomial equation, a set of consecutive coordinates, a set of linked line segments, etcetera. Moreover, the trajectory may be mathematically described as a spatial function in time. The skilled person will be able to select a suitable mathematical trajectory description.

For the sake of simplicity, a Cartesian coordinate system for the printhead positions, electronic toolpaths and trajectories therein is assumed. It will be readily recognized by the skilled person, that any three-dimensional coordinate system can be applied. Moreover, also for the sake of simplicity it is assumed that the printhead is in an upright position for depositing the ME feedstock material in a downward direction substantially parallel to gravity. Other positions and degrees of freedom for the printhead may however be contemplated.

Figure 2:
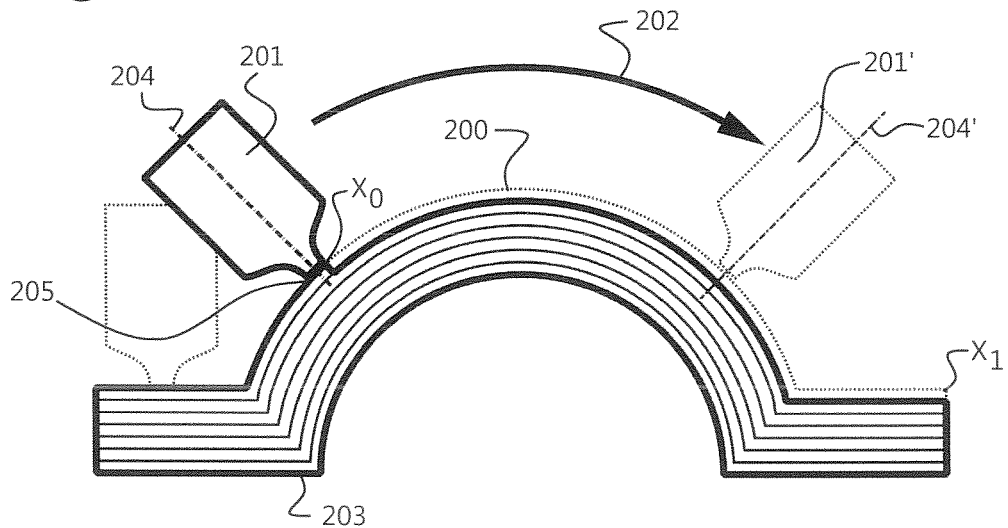
FIG. 2 shows a schematic cross section of a 3D object being fabricated using a ME system.

It can be understood that in the art most electronic toolpaths are typically curved within the plane of each electronic slice. Also, one could imagine that the deposition rate is not constant when making sharp turns, and that the deposition rate can be adjusted to the deposition rate in these cases or vice versa. When making a travel move, the printhead is often retracted by e.g. 3 mm to prevent drawing thin wires between parts of the structure (i.e. dE/dt≠0 while dS/dt≠0), FIG. 2 shows a schematic cross section of a 3D object 203 being printed using a ME system with a printhead 201 having a nozzle 205 for depositing feedstock material on the 3D object in tracks. FIG. 2 shows an example of a trajectory 200 relating to an electronic toolpath along which the elongated centerline of the printhead 201 is to move from position 204 to position 204'.

A positioning system is assumed to be present for moving, rotating and positioning the printhead 201 along the trajectory 200 in a direction of curved arrow 202. The nozzle 205 of the printhead 201 deposits ME feedstock material in accordance with the trajectory 200, to ultimately complete the 3D object 203 to be printed. An electronic toolpath is required to control the positioning system and printhead to perform the deposition of feedstock material. The electronic toolpath mathematically describes among others the trajectory 200 to be traveled by the nozzle from starting point $X_0$ to end point $X_1$. As can be seen in FIG. 2, the trajectory is curved, and allows feedstock material tracks to be adjacently deposited. In the state of the art, the trajectory commonly lies in a non-curved plane corresponding to a layer of feedstock material to be deposited in order to create a 3D object.

FIGS. 3A-3E show block diagrams of exemplary embodiments 300a-300e of the method according to the invention.

Figure 3A:
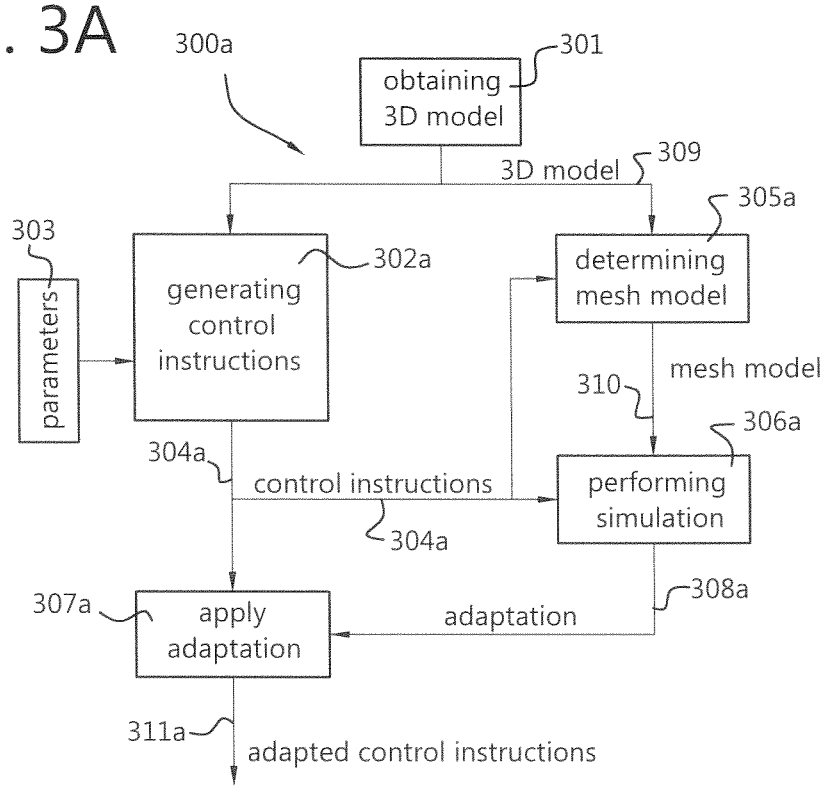
FIG. 3A shows a block diagram of a first exemplary, non-limiting embodiment of a method according to the invention for generating adapted control instructions.

In FIG. 3A a generalized example 300a of the method is shown, wherein in step 301 an electronic 3D model 309 describing the 3D object to be manufactured can be obtained. This may be obtained by a processor or computer receiving the electronic 3D model externally via a connection to another computer or processor wherein the electronic 3D model was designed and/or stored. The electronic 3D model may also be obtained from a memory in which the electronic 3D model is stored, or via a communication link from a task or process in which the electronic 3D model 309 is generated.

A processing step 302a comprises generating control instructions 304a for fabricating the 3D object in an ME system using the electronic 3D model 309. The control instructions 304a may comprise electronic slices, electronic toolpaths and other instructions by which a controller or control unit can control the ME system to perform the fabrication of the 3D object from the deposition of the feedstock material up to and including post-processing, including annealing of the fabricated 3D object.

The control instructions 304a are generated based on the electronic 3D model 309 using process parameters 303. The process parameters 303 cover all process stages for performing the ME process and post-processing. The process parameters 303 may include for example processing time, printhead speed, nozzle temperature, nozzle diameter, print track width, layer thickness, extrusion speed, build chamber temperature, build plate tilt, build chamber air flow, deposition material curing speed, curing heat production rate, etcetera.

Parallel to the generating control instructions 302a, a mesh model 310 can be determined from the electronic 3D model 309 in step 305a.

The mesh model 310 can be structured using a suitable Finite Element Method (FEM) model known in the art. The mesh model has interlinked mesh elements which interact using mathematical relationships based on ME process parameters 303 and properties mathematically affected by these ME process parameters.

In an implementation, the determining the mesh model 305a using a conventional thermo-mechanical FEM model, the elements of the mesh model relating to one or more 3D objects to be fabricated are all linked together at the beginning of the simulation.

One way of optimizing the processing time is to choose different methods of simulations, such as an explicit FEM simulation, an implicit numerical simulation, a voxel-based simulation or a meshless simulation.

Another way of optimizing the processing time is to use a very fine mesh near the location of printing, but a coarser mesh for parts of the simulation that have a lower gradient of the simulated mechanical property in space and/or time. This can be carried out by combining groups of elements far away from the melt pool into larger structures with fewer degrees of freedom, or by replacing these parts of the structure with another mesh.

In step 306a, the mesh model 310 is used to simulate the control instructions 304a. The simulation allows the effect of the process parameters 303 introduced into the mesh model 310 by the control instructions 304a on the properties of the mesh elements to be determined. This way, a deviation of one or more properties from a reference can be determined, which would occur if the control instructions 304a are used to actually fabricate a 3D object without any adaptation. Having a deviation, a compensation for the one or more properties can be determined.

From the compensation, an adaptation for the control instructions may also be determined during the simulation, which adaptation when applied to the control instructions cause a ME system to fabricate a 3D object wherein the deviation which would occur is compensated for. The adaptation 308a can be applied to the control instructions 304a in step 307a, which allows adapted control instructions 311a to be obtained. The adapted control instructions 311a can be used in a ME system to fabricate the 3D object which at the end of the ME process closely resembles the original electronic 3D model 309 and which does not exhibit the deviation predicted in the simulation in step 306a. The person skilled in the art will appreciate that by using the method according to the invention, the original electronic 3D model does not need to be modified to take into account any predicted deviations caused by the ME processed used. The adaptation 308a of the control instructions 304a can apply to at least one of spatial effect, temporal effect, process parameter of the control instructions, as will be further elucidated in further examples below.

Figure 3B:
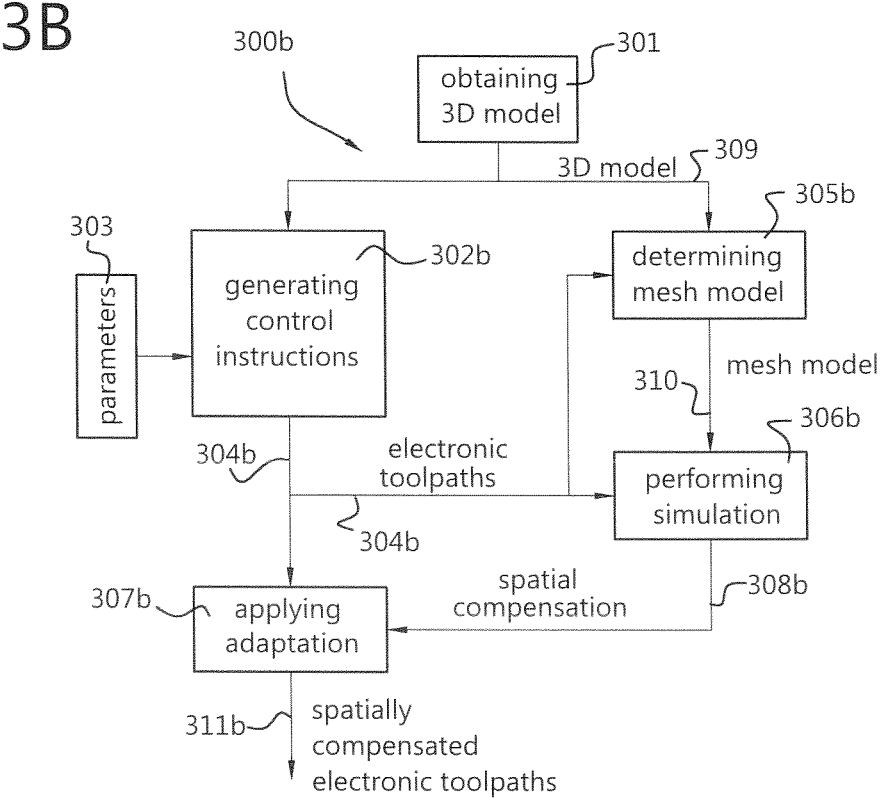
FIG. 3B shows a block diagram of a second exemplary, non-limiting embodiment of the method according to the invention for generating spatially compensated toolpaths.

FIG. 3B shows a block diagram of a second exemplary, non-limiting embodiment 300b of the method according to the invention.

In the embodiment 300b, the step of obtaining a 3D model 301 of a 3D object can be the same as in the embodiment 300a of FIG. 3A. The generating control instructions 302b may comprise generating electronic toolpaths 304b, which can be used to control a ME system to fabricate a 3D object. The electronic toolpaths 304b can be generated using so-called slicer software known in the art. The slicer software determines slices from the electronic 3D model 309 in usually a bottom-up fashion. However any other fashion may apply as determined by policies set for the slicer software. The slices may comprise one or more islands corresponding to ramification of the 3D object. The slices and ramifications are subsequently used to determine electronic toolpaths 304b which can be used to control a ME system, e.g. a 3D printer. The electronic toolpaths 304b may be generated using for example G-code. The person skilled in the art will appreciate that any suitable numerical control (NC) programming language can be used. The electronic toolpaths 304b generated by the slicer software in step 302b provide toolpath trajectories, location, deposition rate, timing, etc., and a time dependent order according to a deposition sequence of the layers of feedstock material set by a parameter 303 of the slicer software.

From the electronic 3D model 309, a mesh model 310 is created in step 305b. In an exemplary implementation of step 305b, the elements of the mesh model are created in a time dependent order, similar to the order in which the feedstock material is deposited during the ME process.

In an alternative implementation of step 305b, the total mesh model 310 is built up at once, but a very low stiffness is assumed for the elements that have not been printed yet. In yet an alternative implementation of step 305b, the total mesh model 310 could be built up at once but the stress or deformation of the mesh elements that have not yet been printed is compensated for.

Figure 4A:
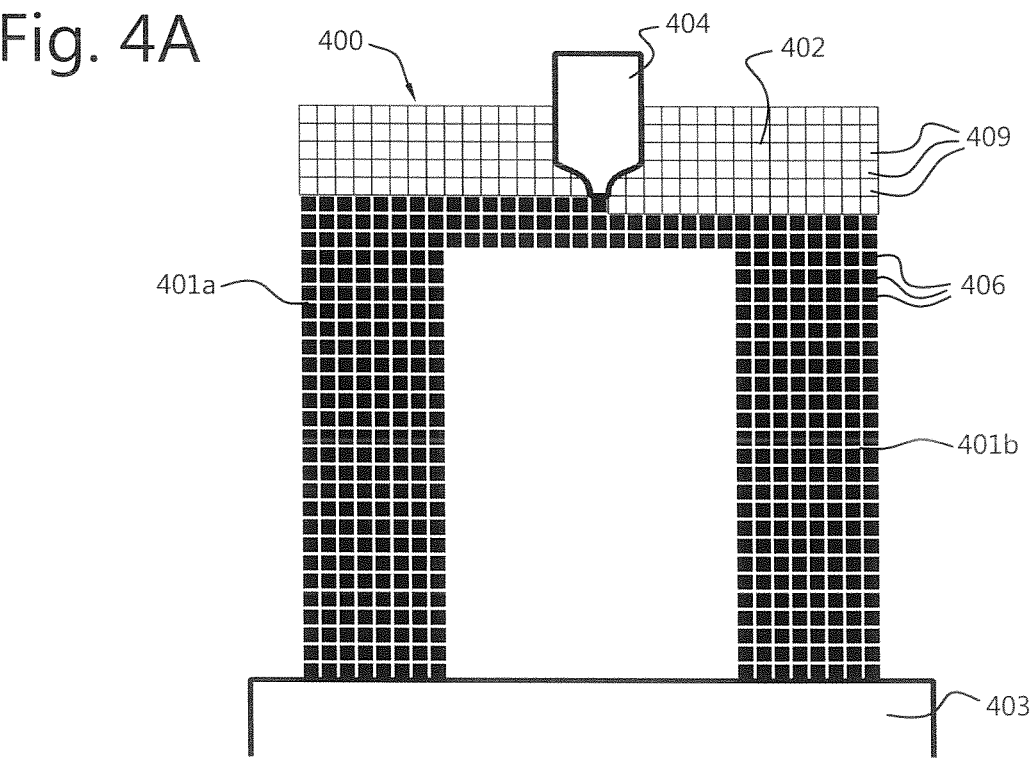
FIG. 4A shows an example of a mesh model of an object to be manufactured.

In yet another implementation of step 305b, to obtain maximum accuracy, the elements of the mesh model 310 can be created along the trajectories of the electronic tool paths indicated by the printhead and switched on (black) mesh elements as will be further explained in relation to FIG. 4A.

As yet another alternative, the mesh model can be determined using slices from the step of generating control instructions.

The electronic toolpaths 304b can be used in the simulation in step 306b. As the electronic toolpaths 304b provide among others trajectories for a printhead, the electronic toolpaths 304b can be mapped on the mesh model 310. Preferably, the location, order, timing and trajectories of the electronic toolpaths 304b can be used to establish an activation sequence of mesh elements of the mesh model 310, which corresponds to the deposition sequence determined by the slicer software settings. Alternatively, activation of the mesh elements according to an activation sequence can also mean at least one of adding the new elements to the stiffness matrix and sequentially changing a property of the elements (e.g. Young's modulus) in the already defined mesh model 310.

When the mesh model 310 is simulated in step 306b in accordance with the activation sequence the mesh element properties may exhibit time dependent behavior corresponding to real world behavior of the 3D object while being printed using the ME process.

The activation sequence however can alternatively be generated bottom-up from the electronic 3D model 309 simultaneous with the structuring of the mesh model 310. A crude approximation can be for example by assuming a constant feedstock material flow rate, thereby assuring that the total time approximates the time predicted by the slicer.

More specifically, when performing thermo-mechanical simulation of the mesh model using the activation sequence, the mesh model dimensions and shape as mesh element properties may evolve depending on deposition temperature, environmental temperature and material properties as they would in the real world.

During simulation in step 306b object dimensions and shape after simulation can be compared to the original dimensions and shape of the electronic 3D model 309 as a reference. Deviations from the original shape and dimensions thereof appearing as spatial deformations can be determined in a thermal-mechanical simulation as a spatial deformation vector field, i.e. a field of spatial deformation vectors for each element of the mesh model 310. Based on the spatial deformation vector field, a spatial compensation vector field can be determined, i.e. a field of spatial compensation vectors for each element of the mesh model. The spatial compensation vector field is used to obtain dimensions and shape of the fabricated 3D object corresponding to the shape and dimensions of the original electronic 3D model. The spatial compensation 308b can be used as adaptation of the electronic toolpaths 304b in step 307b of applying the adaptation, by performing a coordinate transformation to their electronic toolpath trajectories using the spatial compensation vector field.

The spatially compensated electronic toolpaths 311b allow deposition of feedstock material in a spatially curved manner as shown in FIG. 2, thereby compensating for shrinkage after deposition of molten feedstock material. The person skilled in the art will appreciate that before cooldown, the printed 3D object will appear distorted. However, after cooldown, the printed 3D object will closely resemble the original electronic 3D model in shape and dimensions, as will be further explained in more detail in relation to the examples shown in FIGS. 4A-4C.

In the embodiment of the method according to the invention shown in FIG. 3B, the simulation step 306b may be performed in two steps. In a first step, the mesh model 310 can be simulated using one or more ME process parameters associated with shape deformation such as heat generation, temperature, curing rate, density or density change in time, chemical reaction etc. wherein the simulation can be performed using the time dependent sequence of mesh elements. Thus, when for example temperature is used, the mesh model 310 shows a prediction of an evolving temperature profile of the 3D object to be manufactured while the time dependent sequence of mesh elements can be followed.

In a second step, the deformation of the 3D object to be manufactured can be simulated in a mechanical simulation using the results of the first simulation. The elements of the mesh model 310 may have thermal and mechanical properties such as heat capacity, thermal expansion, thermal conductivity, density, elasticity, shear, object dimensions, object shape and residual stress. These properties can be related to the ME process parameter with coefficients such as a thermal conductivity coefficient, a heat transfer coefficient, thermal expansion coefficient, Young's modulus, shear modulus and Poisson's ratio.

The spatial compensation vector field 308b in its simplest form can be determined by reversing the spatial deformation vector field. Alternatively, in the mechanical simulation any coefficient or combination of coefficients, related to the physical property to obtain the deformation may be sign reversed, or inverted to obtain the spatial compensation. Moreover, the spatial compensation vector field may be determined as a function in time.

A second method of obtaining the spatial compensation vector field comprises inverting a coefficient which links the simulated property of a mesh element to at least one of the process parameters 303. For instance, the coefficient of thermal expansion of each element of the mesh model in the simulation may be sign reversed. If for instance the sign reversed value of the coefficient of thermal expansion is used in the simulation, the object appears to grow as it cools down, which directly results in a spatial deformation vector field as schematically shown in FIG. 4C.

A third method of obtaining the spatial compensation vector field comprises performing a two-step simulation. In a first simulation step, a thermal simulation of the printing process can be carried out. The temperature of each element in the mesh model can be stored in the memory of the processor for each point in time until the 3D object is fully cooled down to room temperature. Then, in a second simulation step, a mechanical stiffness model of the 3D object can be created with the intended shape. Each element of the mechanical model receives the corresponding stored temperature as a function of time, but then going backwards in the time domain. The mechanical model will initially (i.e. after printing, annealing and final cool-down) have the intended shape and will grow as the temperature is elevated going backwards in time. Upon simulating the ME process backwards in time, elements are subsequently being removed from the stiffness model. However, the spatial deformation vector of each element just before removal is remembered. The combined spatial deformation vectors of all elements together constitute the spatial deformation vector field that is used as the spatial compensation vector field to obtain spatially compensated electronic toolpaths 311b.

When the spatially compensated electronic toolpaths 311b have been generated, it may be required to convert the electronic toolpaths 311b into control instructions which can be handled by a ME system controller. Such control instructions may be generated using for example G-code that is widely used in ME systems and CNC machines. The person skilled in the art will appreciate that any suitable numerical control (NC) programming language can be used.

Figure 3C:
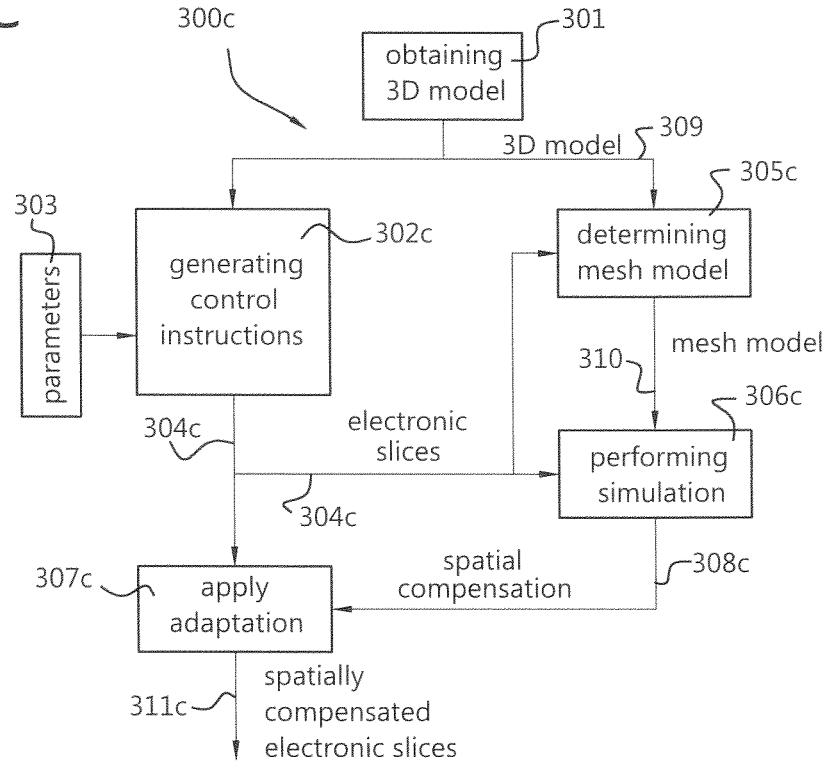
FIG. 3C shows a block diagram of a third exemplary, non-limiting embodiment of the method according to the invention for generating spatially compensated slices.

FIG. 3C shows a block diagram of a third exemplary, non-limiting embodiment 300c of the method according to the invention.

The electronic 3D model 309 can be obtained as described above in step 301. The mesh model 310 and time dependent sequence of mesh elements can be generated from the electronic 3D model in step 305c using the electronic slices 304c as control instructions from the slicer in the step of generating control instructions 302c.

Furthermore, the mesh model 310 can be simulated in step 306c as discussed above. From the simulation, a spatial compensation vector field 308c can be determined. The electronic slices 304c can then be adapted using the step of applying the adaptation 307c, wherein the electronic slices 304c are spatially compensated using coordinate transformation based on the spatial compensation vector field. The spatially compensated electronic slices 311c can be used as adapted control instructions to control an ME system, e.g. a 3D printer.

In case the ME system is not equipped to handle spatially compensated electronic slices 311c, the step of applying adaptation 307c may include an additional step wherein the spatially compensated electronic slices 311c can be used to generate spatially compensated electronic toolpaths as adapted control instructions. The spatially compensated electronic toolpaths can subsequently be generated by an electronic toolpath generator. The spatially compensated electronic toolpaths can further be processed according to the state of the art by the ME system to manufacture the 3D object.

Figure 3D:
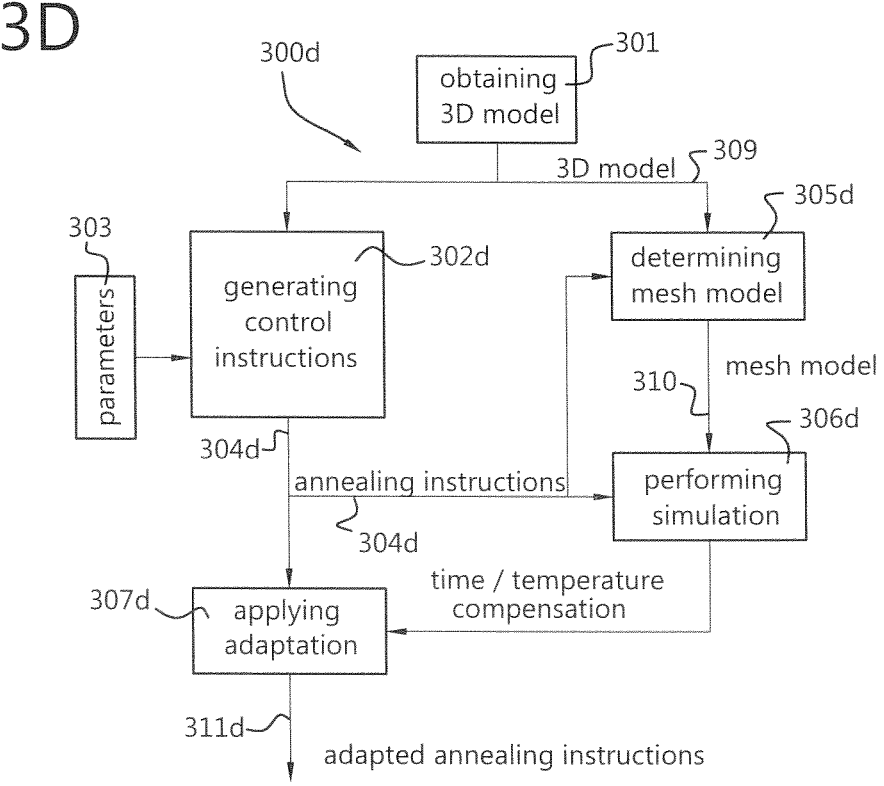
FIG. 3D shows a block diagram of a fourth exemplary, non-limiting embodiment of the method according to the invention for generating adapted annealing instructions.

FIG. 3D shows a block diagram of a fourth exemplary, non-limiting embodiment 300d of the method according to the invention. More specifically, the post-processing includes annealing.

During the ME process, shrinkage can result in internal stress in the 3D object to be manufactured. Due to plastic deformation and visco-elastic behavior of the material, stresses can be partially released under the influence of temperature and time. Residual stress in the final 3D object reduces the mechanical load capability of the 3D object, and may cause deformations of the 3D object as the stresses gradually relax over time. An objective of the simulation can be to provide control instructions for the ME and annealing process that enable the fabrication of a 3D object having minimal residual stress. This can be done by:

further simulating the annealing process after simulating the ME process, and by optimizing the annealing procedure during simulation to obtain a better optimum between anneal temperature, anneal time and residual stress;

simulating different orders in which the toolpaths are printed, and choosing the most optimal order;

changing the course in which the layers are printed to distribute the heat induced by the ME process in a better way;

modifying print speed or deposition speed locally.

In FIG. 3D, step 302d of generating control instructions can comprise generating control instructions to set the annealing temperature in an annealing space and timer settings according to the process parameters 303, to allow the annealing to occur according to a predefined temperature profile in time.

The step of determining a mesh model 305d can be performed as described in relation to any one of FIGS. 3A-3C. The mesh model 310 can be taken after the thermo-mechanical simulation 306a, 306b or 306c of the spatial properties of control instructions relating to the ME process.

The simulation in step 306d using the annealing temperature settings and timer settings may include simulating the cool down trajectory after printing, incorporating the anneal procedure after printing. During the simulation, the temperature, the residual stresses and amount of residual stresses within the 3D object, relaxation of residual stress as a function of time and temperature, and the spatial deformation vector field of the printed shape can be predicted.

Based on simulated values for residual stress and spatial deformations, adaptation 308d of the annealing temperature and timer settings can be obtained.

Application of the adaptation 308d to the annealing instructions 304d, i.e. annealing temperature and timer settings, can be performed in step 307d. A temperature setting of an annealing oven, or a setting of an annealing timer in the control instruction may be altered in accordance with the adaptation 308d resulting from the simulation 307d. In this way adapted annealing instructions 311d can be obtained.

Figure 3E:
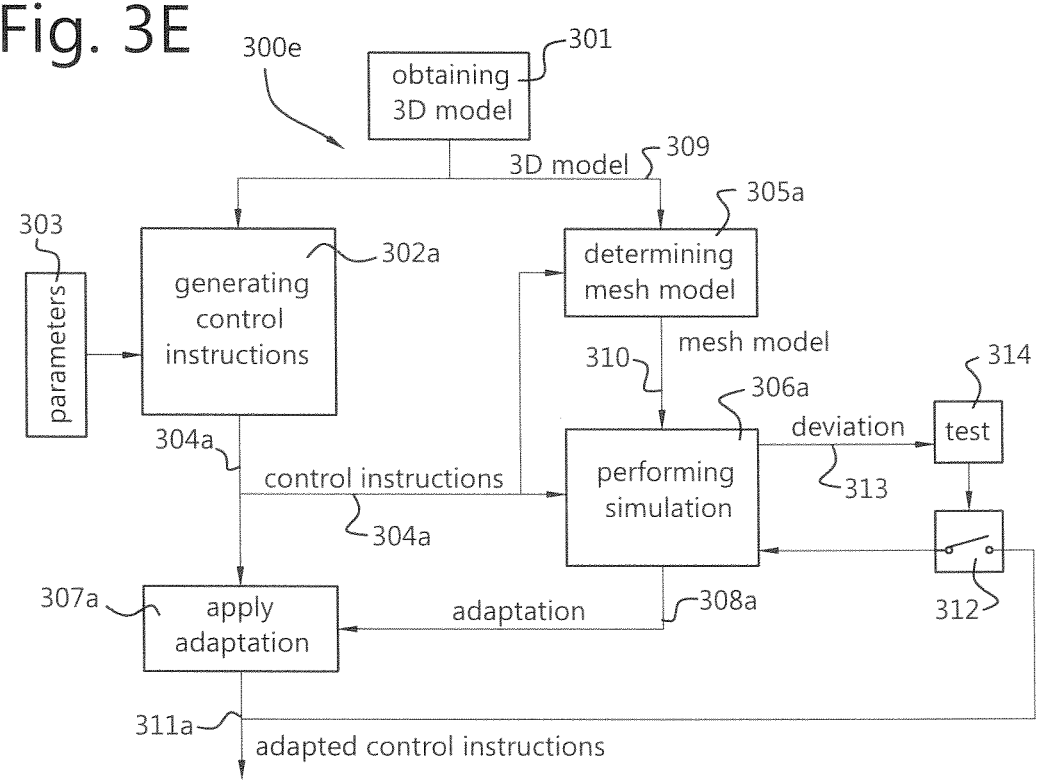
FIG. 3E shows a block diagram of a fifth exemplary, non-limiting embodiment of the method according to the invention for generating adapted control instructions.

FIG. 3E shows a block diagram of a fifth exemplary, non-limiting embodiment 300e of the method according to the invention. According to the fifth embodiment, the method for generating adapted control instructions for a fabrication process of a 3D object using a material extrusion process for 3D printing, in accordance with the examples of FIGS. 3A-3D, can be iterated. As shown in FIG. 3E, the adapted control instructions 311a can be conditionally fed back 312 to the simulation 306a using a test 314. The test criterion can be for example a deviation 313 pertaining to a property simulated in step 306a being above a predetermined threshold. When the test criterion is met, the adapted control instructions are iterated and fed back 312 into the simulation step 306a, thereby allowing a refinement of the adapted control instructions to be performed. The iteration of adapted control instructions can also apply to the exemplary embodiments 300b, 300c, and 300d of the method according to the invention as described in relation to FIGS. 3B, 3C and 3D.

In any of the exemplary embodiments 300a, 300b, 300d of the method according to the invention, the simulation can be repeated until the deviation after simulation of the ME process is below a certain threshold. If the accuracy of the optimized property is insufficient, subsequent iterations can be carried out to improve the accuracy of the compensation and subsequent adaptation of the control instructions can be performed.

In general, the adaptations on the electronic toolpaths can be relatively small, and thus the adaptations do not change the calculations of the physical property associated with the ME process significantly. Therefore, upon subsequent iterations it might not be required to repeat the ME process parameter calculations but only the mechanical property calculations.

In the mechanical property simulation, one or more mechanical properties may be dependent on each other. The adaptation will be more accurate if one or more of these dependencies are considered in the mesh model.

Regarding simulations in which spatial properties of the mesh elements are evaluated, the respective spatial compensation may be effected directly on the mesh model instead of applying the spatial compensation to the control instructions, i.e. electronic toolpaths. Iterating the adapted control instructions, i.e. the spatially compensated electronic toolpaths may be skipped in this case.

In any of the used methods, the simulation and compensation can be carried out by approximating material properties by assuming constant values during the ME process. Properties such as Young's modulus, coefficient of thermal expansion, thermal conductivity, specific heat capacity can be a function of the temperature. Especially when printing semi-crystalline materials, the temperature dependency can be non-linear, Polymers are also known to have strong time dependent behavior, such as visco-elasticity, more specifically creep or stress relaxation. The temperature at which the material crystallizes can be also depending on the cooling rate (i.e. speed of cooling down).

When depositing certain feedstock materials such as polymers, shear may occur in the nozzle which causes alignment of the molecules along the flow. Therefore, in the simulation, material properties such as the coefficient of thermal expansion, the Young's modulus and the thermal conductivity, among others, may be simulated having a different value in a direction along the trajectory of an electronic toolpath than in a direction transverse to the trajectory of the electronic toolpath.

Figure 4B:
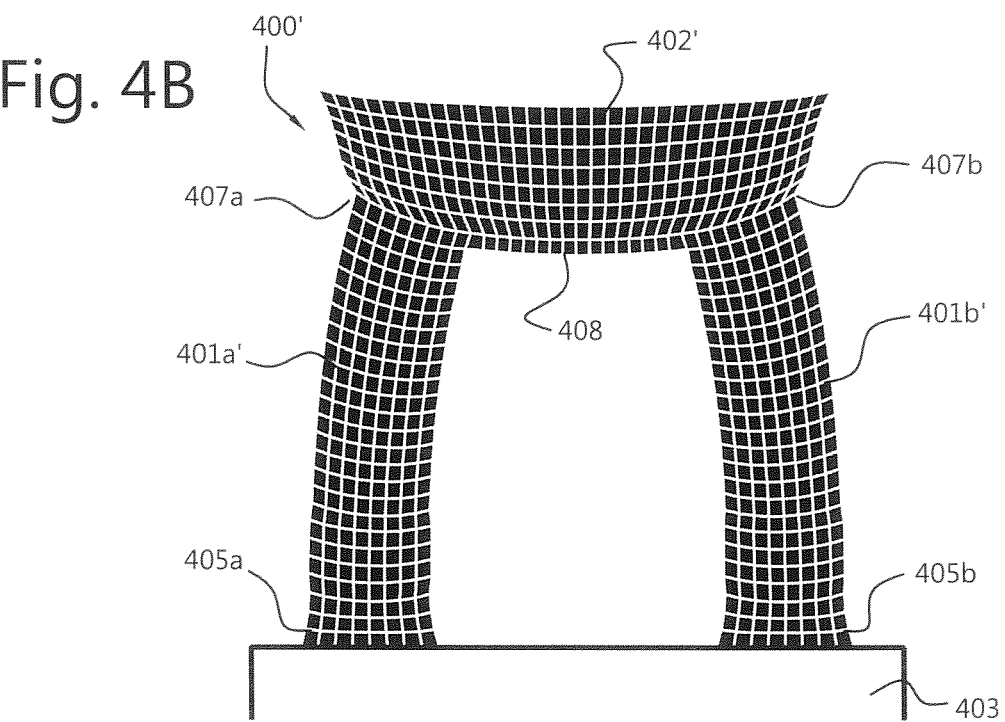
FIG. 4B shows a simulated deformed mesh model of the object of FIG. 4A.
Figure 4C:
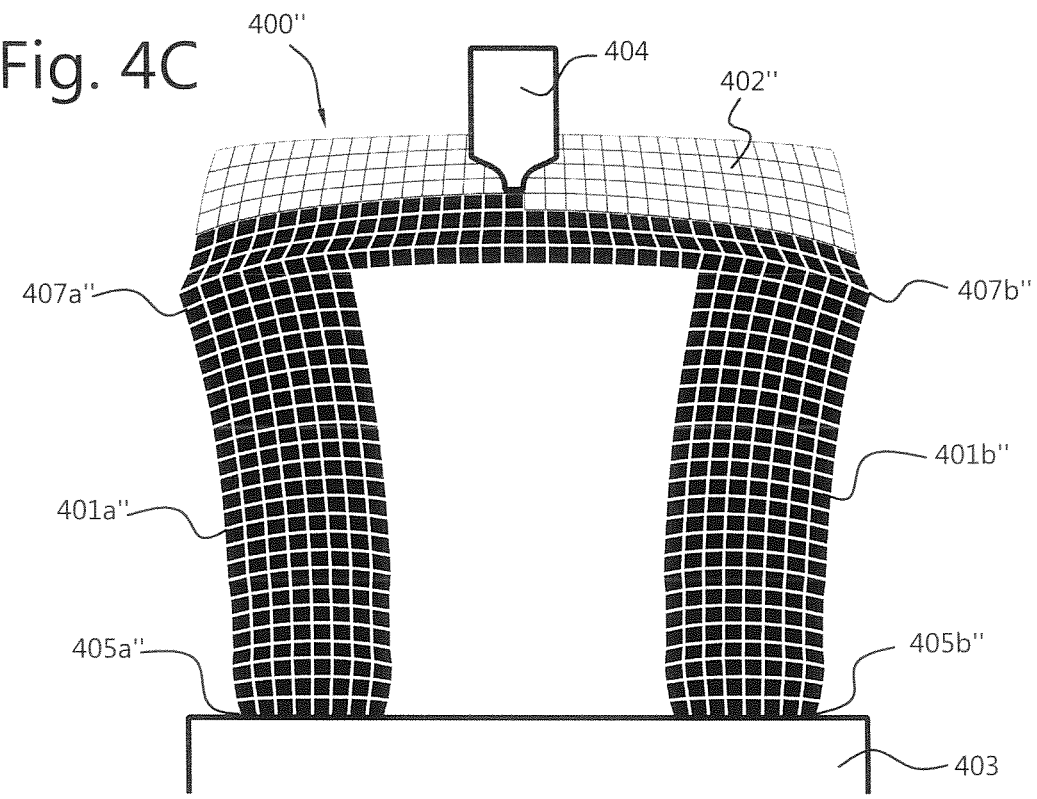
FIG. 4C shows a spatially compensated mesh model of the object of FIG. 4B.

In FIGS. 4A-4C an example is shown of a 2D representation of a 3D object to be manufactured in various stages of the process. The 2D representation is chosen for the sake of simplicity.

FIG. 4A shows a mesh model 400 of the 3D object. The mesh model 400 has columns 401a, 401b placed on a base 403, and cross beam 402 between the columns, corresponding with the columns 101a, 101b, base 103 and cross beam 102 in FIG. 1A.

For simplicity of the explanation, a 2D model is used in the example, but a ME process with three or more degrees of freedom can be subject of the simulation. The mesh model 400 is shown with a simulated printhead 404 which symbolically indicates the time dependent activation of the mesh elements, wherein the elements of the mesh model 400 are subdivided in completed mesh elements 406 (black) and not-yet-completed mesh elements 409 (white).

FIG. 4B shows the mesh model 400' that results upon subjecting the original mesh model 400 to the deformation that was predicted by the simulation of the ME process parameter associated with mechanical deformation. As is customary in a finite element method analysis, the deformation can be exaggerated. The 3D object shown in FIG. 4B, comprises a cross beam 402' having a concave deformation, bases of the columns 405a, 405b having deformations in the shape of an elephant's foot, and indentations 407a, 407b. The columns 401a' and 401b' are shown inclined towards each other.

FIG. 4C shows a spatially compensated mesh model 400" that is obtained by applying the spatial compensation vector field that is determined based on the deformed mesh model 400' shown in FIG. 4B to the original mesh model 400 shown in FIG. 4A. In this way it is possible to obtain a 3D object after printing that has a shape that is in accordance with the electronic 3D model without having to modify the original electronic 3D model to compensate for the spatial deformations that are brought about by the printing process. As may be clear from FIG. 4C, the spatial compensation can be applied to the original electronic toolpaths that are used to fabricate the 3D object. The spatially compensated mesh model 400" comprises columns 401a" and 401b" that are each inclined outwardly, bulges 407a" 407b", constrictions 405a", 405b" at the bases of the columns, and upwardly curved cross beam 402". After actually fabricating the 3D object in a ME system using the spatially compensated electronic toolpaths obtained from the simulations as discussed in relation to FIGS. 3B and 3C, a 3D object will be obtained that has a shape that is closely in accordance with the electronic 3D model of the 3D object.

Figure 5A:
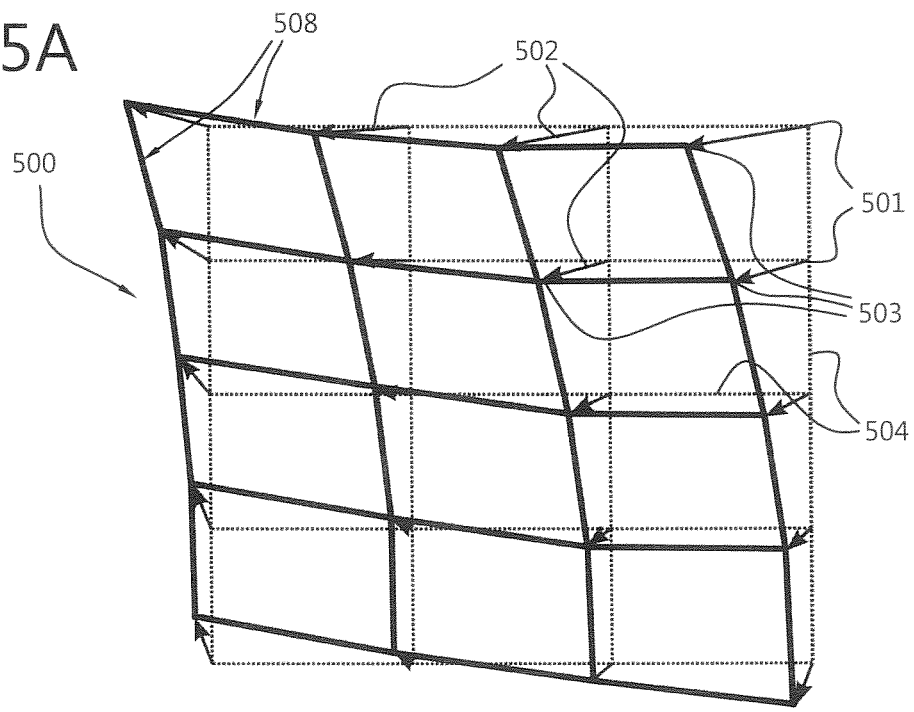
FIG. 5A shows a detail of the mesh model of FIG. 4B.
Figure 5B:
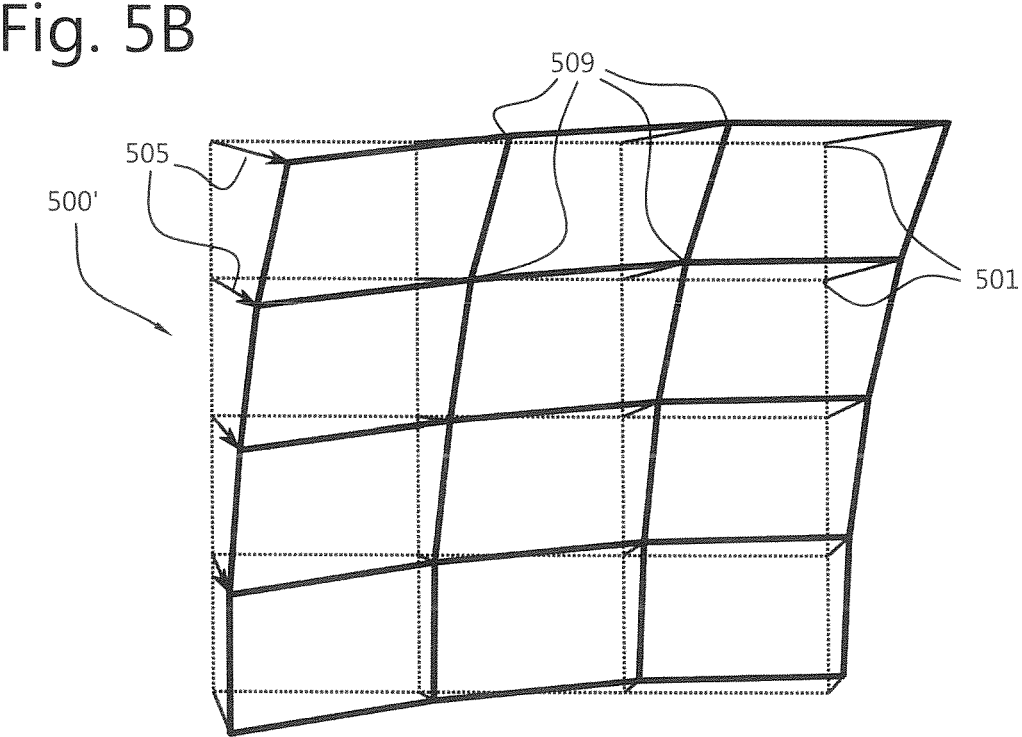
FIG. 5B shows a detail of the mesh model of FIG. 4C.
Figure 5C:
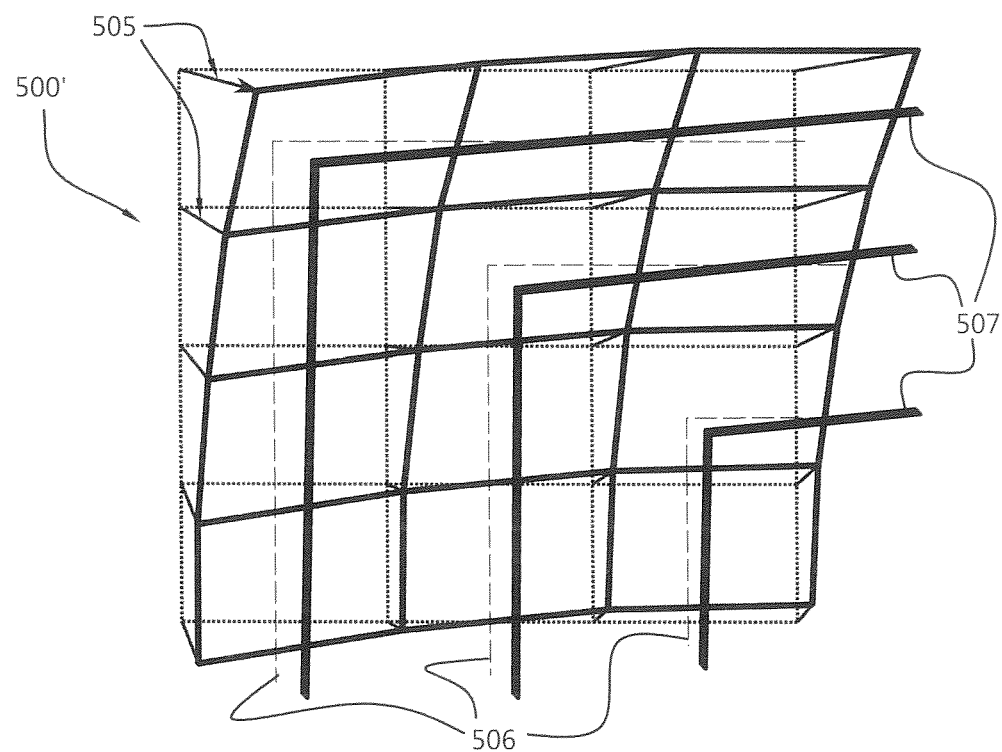
FIG. 5C shows a detail of the mesh model of FIG. 4C including a schematic representation of spatially compensated toolpaths.

FIGS. 5A-5C show examples 500, and 500' of a simulation of a 2D mesh model, showing a spatial deformation vectors 502 of a spatial deformation vector field, spatial compensation vectors 505 of a spatial compensation vector field and spatially compensated electronic toolpaths 507.

FIG. 5A shows a deformed mesh model 500, the thin dashed lines represent the boundaries of undeformed elements 504 in the undeformed mesh model. Spatial deformation vectors 502 originate from the nodes 501 of the elements ending in a deformed node 503 of the deformed elements 508 of the deformed mesh model 500. Together the spatial deformation vectors form a discretized spatial deformation vector field. The spatial deformation within the elements, can be interpolated from the spatial deformation vector field in a way depending on the type and order of the elements chosen (e.g. linear, quadratic, etc.).

FIG. 5B shows a spatially compensated mesh model 500', the spatial compensation vectors 505 are shown, which can be in this case obtained by reversing the direction of the spatial deformation vectors 502 of FIG. 5A. Each arrow originating from a node 501 from the undeformed mesh model arrives in a node 509 of the spatially compensated mesh model 500'. The spatial compensation vectors 505 together form a discretized spatial compensation vector field. This spatial compensation vector field can also be an approximation of a continuous mathematical field. The spatial compensation within the elements, can be interpolated from the spatial compensation vector field in a way depending on the type and order of the elements chosen (e.g. linear, quadratic, etc.).

FIG. 5C shows the spatially compensated mesh model 500' of FIG. 5B with spatially compensated electronic toolpaths 507. The dashed lines 506 indicate the original electronic toolpaths determined using the original electronic 3D model. The thick continuous lines 507 indicate the spatially compensated electronic toolpaths that are obtained by performing a coordinate transformation based on the spatial compensation vector field on the coordinates of the original electronic toolpaths.

It may be appreciated that a different mathematical representation may be required to describe the adapted electronic toolpaths, e.g. a straight line may have to be subdivided in multiple sections or replaced by another mathematical function such as a polynomial to describe the curvature of the toolpath trajectory. It will be further appreciated that a similar coordinate transformation can be performed on the coordinates of original electronic slices to obtain spatially compensated electronic slices. The latter can be converted into spatially compensated electronic toolpaths that can be converted into adapted control instructions.

As a result of the spatially compensated electronic toolpaths 507 shown in FIG. 5C, the accuracy of the dimensions of the printed 3D object as well as the reliability of the ME process are improved. The person skilled in the art will appreciate that it could also be an objective to optimize additional, or other, properties of the ME process, such as the residual stress in the 3D object after printing, the shape of a temporary support structure or the time it takes to print the 3D object.

Figure 6A:
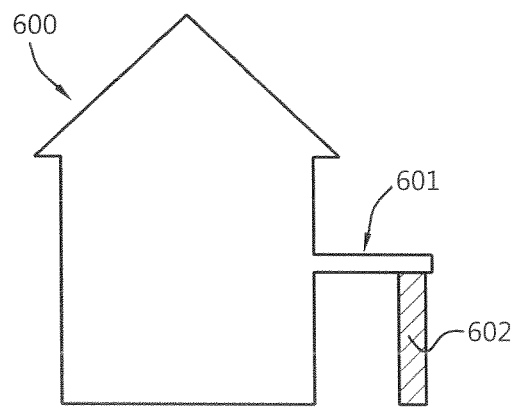
FIG. 6A shows a schematic cross-sectional view of an exemplary 3D object to be manufactured with a support structure according to an embodiment of the invention.
Figure 6B:
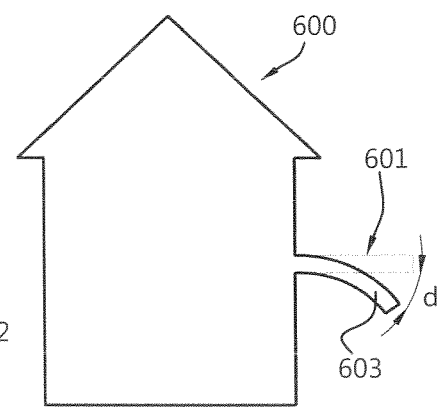
FIG. 6B shows a schematic cross-sectional view of the exemplary 3D object of FIG. 6A when manufactured without using a support structure.

FIGS. 6A and 6B show a schematic cross-sectional view of an exemplary 3D object to be printed.

Based on the simulation in accordance with any one of the embodiments 30a-300e of the method according to the invention as described above, during printing the deformation of the eventual 3D object can be determined and compensated for. In some situations, the simulation however does not provide an adequate solution. An example of this can be the house 600 with balcony 601 in FIG. 6A. In for example the step of generating control instructions 302b, 302c of the respective embodiments 300b, 300c of the method according to the invention, it could be established that based on the dimensions of the balcony 601 the application of a support structure 602 is required in order to avoid unwanted deformation of the balcony 601 after printing.

It is common in the art that the support structure is not part of the original 3D model 309 but is generated by the generating control instructions 302b, 302c, i.e. the slicer. The exemplary step of generating control instructions 302b, 302c of the respective embodiments 300b, 300c of the method according to the invention may in that case provide for optional electronic toolpaths pertaining to the support structure 602. These optional electronic toolpaths may have a capability of being activated or deactivated. In a first simulation instance in step 306b, 300c of the respective embodiments 300b, 300c of the method according to the invention the support structure is temporarily removed by deactivating the optional electronic toolpaths. When the simulation in step 306b or step 306c respectively results in a simulated shape 603 of the balcony which has a deviation d from the intended shape of the balcony 601 beyond a predetermined threshold, i.e. the simulated result shows a deviation or deformation in shape beyond the intended shape 601, In this case, the optional electronic toolpaths may be reactivated, thereby reinstating the support structure 602. When however, after simulation the deviation d is lower than a predetermined threshold, the optional electronic toolpaths for the support structure 602 may remain deactivated, thereby making the support structure 602 superfluous.

It may appreciate that different properties can be assigned to elements in the mesh representing the support structure. If the support structure is for example to be printed from a different material, the simulation may lead to different behavior of the properties of that material.

Alternatively, in accordance with embodiment 300e of the method according to the invention as shown in FIG. 3E, when iterating the simulation does not converge to an adequate solution or when for example the spatially compensated electronic toolpaths intersect with geometry that was already printed, the temporary support structure 602 is apparently required to enable sufficient optimization of the property to be optimized. An adaptation of the algorithm can be proposed to detect non-convergence of the simulation and iteratively adding and removing support structures by respectively activating and de-activating optional electronic toolpaths pertaining to the temporary support structures to improve the iterative process until the optimization goal has been met. In this way the support structures can be kept as separate objects in the model. The simulation can then switch on or off each individual section of the support structure and determine the deformation difference of the supported structure. Thus, the advantage can be that less support material is required (i.e. less consumption of support material, less time to print the 3D object, and less post-processing costs).

Figure 7:
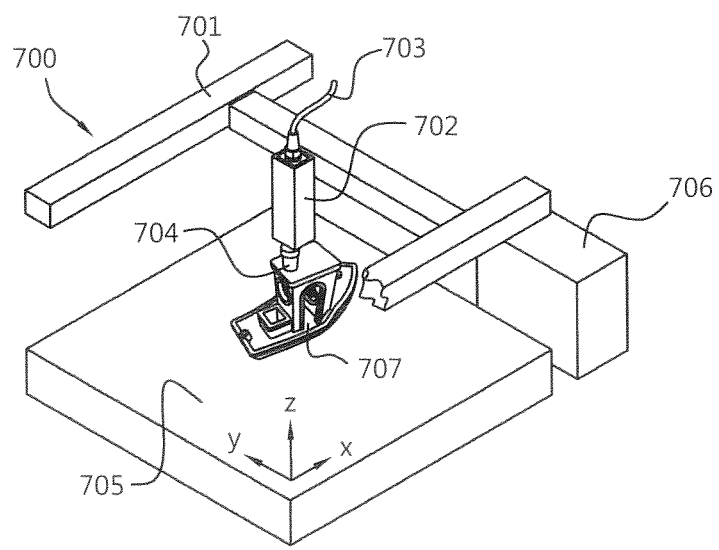
FIG. 7 shows a schematic isometric view of a system for fabricating of a 3D object using a 3D printing material extrusion (ME) process.

FIG. 7 shows a schematic isometric view of a ME system 700 for fabricating a 3D object 707 using a ME process to deposit feedstock material.

The system 700 has a 3D positioning system 701 to spatially move a printhead 702. The printhead has a feedstock material supply 703 and a nozzle 704 to deposit the feedstock material on the 3D object 707 located on a baseplate 705. The system 700 further comprises a control unit 706, which can be arranged for controlling the positioning system 701, the printhead 702 and the feedstock material supply 703. The control unit 706 may be arranged to receive control instructions which allow the control system to fabricate the 3D object 707 in accordance with a 3D model. The control unit 706 may have a processor and memory, and executable instructions which allow the control unit to control the system 700 via suitable interfaces.

The control instructions may comprise adapted control instructions which were generated according to any one of the methods as described above.

Common 3D printing systems using ME processes may be configured to move the printhead in 3 degrees of freedom, typically in X, Y and Z coordinates. Some ME systems have different numbers of degrees of freedom, such as the printer shown in FIG. 2. Due to the additional degrees of freedom, this configuration allows for slicing the 3D object in layers which follow the curvature of the 3D object. This can be beneficial for the strength of the printed 3D object. It can prevent the need of a temporary support structure and it can also enable the printing of structures which are difficult to access by the printhead.

ME systems can be configured to have 4, 5 or even more degrees of freedom. The methods described in this patent are not restricted to ME systems such as 3D printers with 3 degrees of freedom, but can also be used for ME systems with other numbers of degrees of freedom.

Figure 8:
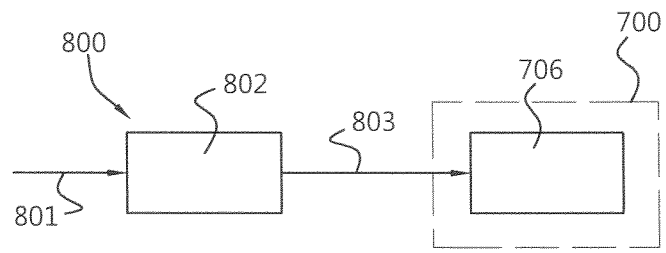
FIG. 8 shows a block diagram of a system for fabrication of a 3D object using a 3D printing material extrusion (ME) process.

FIG. 8 shows a block diagram of a 3D printing system 800 using a ME process to deposit feedstock material to fabricate a 3D object. A processing unit 802 such as a personal computer can be arranged to obtain an electronic 3D model 801. The processing unit 802 can further be arranged to perform the steps of any one of the embodiments of the method for generating adapted control instructions for a fabrication process of a 3D object using a material extrusion process for 3D printing as described above.

Adapted control instructions 803 generated by the processing unit 802 can be supplied to the control unit 706 of the ME system 700 for fabricating a 3D object 707 using a ME process to deposit feedstock material. The processing unit 802 and the control unit 706 may be integrated as a single combined processing unit.

It will be clear to a person skilled in the art that the scope of the present invention may be not limited to the examples discussed in the foregoing but that several amendments and modifications thereof are possible without deviating from the scope of the present invention as defined by the attached claims. In particular, combinations of specific features of various aspects of the invention may be made. An aspect of the invention may be further advantageously enhanced by adding a feature that was described in relation to another aspect of the invention. While the present invention has been illustrated and described in detail in the figures and the description, such illustration and description are to be considered illustrative or exemplary only, and not restrictive.

The present invention is not limited to the disclosed embodiments. Variations to the disclosed embodiments can be understood and effected by a person skilled in the art in practicing the claimed invention, from a study of the figures, the description and the attached claims. In the claims, the word "comprising" may include other steps or elements, and the indefinite article "a" or "an" may relate to a single entity or a plurality of entities. The mere fact that certain measures are recited in mutually different dependent claims does not indicate that a combination of these measures cannot be used to advantage. Any reference numerals in the claims should not be construed as limiting the scope of the present invention.

REFERENCE NUMERALS

| | |
|---|---|
| 100, 100' | Two-dimensional representation of a three-dimensional model |
| 101a, 101b | Column |
| 101a', 101b' | Deformed column |
| 102 | Cross Beam |
| 102' | Deformed cross beam |
| 103 | Base |
| 104 | Deformed object |
| 105a, 105b | Elephant's foot |
| 106a, 106b | Column thermal center line |
| 107a, 107b | Indentation |
| 108 | Convex deformation |
| 200 | Trajectory |
| 201 | Printhead |
| 202 | Curved arrow |
| 203 | 3D object to be printed |
| 204, 204' | Printhead position |
| 205 | Nozzle |
| $X_0$ | Starting point |
| $X_1$ | End point |
| 300a, 300b, 300c, 300d, 300e | Embodiment of method according to the invention |
| 301 | Obtain electronic three-dimensional model |
| 302a, 302b, 302c, 302d | Generating control instructions |
| 303 | Process parameters |
| 304a | Control instructions |
| 304b | Electronic toolpaths |
| 304c | Electronics slices |
| 304d | Annealing instructions |
| 305a, 305b, 305c, 305d | Generate mesh model from 3D model |
| 306a, 306b, 306c, 306d | Simulate control instructions using mesh model |
| 307a, 307b, 307c, 307d | Apply adaptation |
| 308a | Adaptation |
| 308b, 308c | Spatial compensation vector field |
| 308d | Annealing process adaptation |
| 309 | Electronic 3D model |
| 310 | Mesh model |
| 311a | Adapted control instructions |
| 311b | Spatially compensated toolpaths |
| 311c | Spatially compensated slices and/or toolpaths |

| | -continued |
|---|---|
| 311d | Adapted annealing instructions |
| 312 | Decision for next iteration |
| 313 | Deviation |
| 314 | Test |
| 400 | Mesh model of the three-dimensional object |
| 400' | Deformed mesh model of the three-dimensional object |
| 400" | Compensated mesh model of the three-dimensional object |
| 401a, 401b | Columns |
| 401a', 401b' | Inwardly inclined column |
| 401a", 401b" | Outwardly inclined column |
| 402 | Cross beam |
| 402' | Concavely deformed cross beam |
| 402" | Curved cross beam |
| 403 | Base |
| 404 | Printhead |
| 405a, 405b | Elephant's foot |
| 405a", 405b" | Constriction |
| 406 | Completed mesh element |
| 407a, 407b | Indentation |
| 407a", 407b" | Bulge |
| 408 | Convex deformation |
| 409 | Not-yet-completed mesh element |
| 500 | Deformed mesh model |
| 500' | Spatially compensated mesh model |
| 501 | Node |
| 502 | Spatial deformation vector |
| 503 | Deformed node |
| 504 | Boundaries of undeformed elements |
| 505 | Spatial compensation vector |
| 506 | Original electronic toolpath |
| 507 | Spatially compensated electronic toolpath |
| 508 | Shape of the deformed elements resulting from the simulation |
| 509 | Node of the compensated mesh model |
| 600 | 3D model |
| 601 | Balcony |
| 602 | Support structure |
| 603 | Simulated shape of the balcony |
| d | deviation |
| 700 | ME System for fabricating a 3D object |
| 701 | Positioning system |
| 702 | Printhead |
| 703 | Feedstock material supply |
| 704 | Nozzle |
| 705 | Baseplate |
| 706 | Control unit |
| 707 | 3D object being printed |
| 800 | System for fabrication of a 3D object using a 3D printing ME process |
| 801 | Electronic 3D model |
| 802 | System for generating adapted control instructions |
| 803 | Adapted control instructions |

What is claimed is:

1. A method for generating adapted control instructions for a material extrusion (ME) process included in a fabrication process of a three-dimensional (3D) object using a material extrusion (ME) process for 3D printing, the adapted control instructions comprising at least one of spatially compensated electronic toolpaths, spatially compensated electronic slices, and other instructions by which a controller or control unit is enabled to control an ME system to perform the fabrication of the 3D-object from deposition of feedstock material up to and including post-processing, including annealing of the fabricated 3D-object, the method comprising:

obtaining an electronic 3D-model of the 3D-object to be fabricated;

generating control instructions based on said electronic 3D-model and process parameters of said fabrication process, wherein said process parameters include ME process parameters relating to the ME process and process parameters relating to post-processing of the 3D-object;

determining a mesh model representing said electronic 3D-model, the mesh model comprising interlinked mesh elements which interact using mathematical relationships based on ME process parameters, each mesh element having at least one property associated with at least one physical property of the 3D-object, said at least one property being mathematically affected by at least one of said ME process parameters;

performing simulation of said fabrication process in time using said control instructions, said mesh model and said process parameters comprising:

establishing a deviation of said at least one property relative to a reference thereof for each element of the mesh model, wherein said deviation is induced by at least one of said process parameters;

determining an adaptation for said at least one property of said each element of the mesh model to compensate for said deviation;

applying said adaptation to said control instructions to obtain at least one adapted control instruction allowing fabrication of the 3D-object that remains accurate to the electronic 3D-model after at least one of cooling down to room temperature at the end of the fabrication process and during use of the printed 3D-object in accordance with specifications for use of the 3D-object.

2. The method according to claim 1, wherein the generating control instructions comprises generating at least one electronic toolpath, comprising:
generating at least one deposition sequence of feedstock material for said ME process based on said electronic 3D-model;
determining at least one electronic slice representing a layer of the 3D-object to be manufactured;
determining at least one electronic toolpath for each of the at least one electronic slice; and
wherein the determining the at least one electronic slice and the determining the at least one electronic toolpath is performed according to said deposition sequence.

3. The method according to claim 2, wherein the performing simulation of said fabrication process in time comprises simulation of the ME process, comprising:
determining at least one activation sequence of the elements of the mesh model corresponding to said at least one deposition sequence;
performing said simulation of said ME process in accordance with said activation sequence to obtain a ME simulation result.

4. The method according to claim 3, wherein said determining an activation sequence comprises one of:
spatially mapping said at least one electronic toolpath on elements of the mesh model; and
spatially mapping the at least one electronic slice on elements of the mesh model.

5. The method according to claim 3, wherein the generating at least one deposition sequence comprises generating a plurality of mutually different deposition sequences, and wherein the performing said simulation of the ME process comprises:
repeating until said deviation is below a first predetermined threshold:
i. said generating at least one electronic toolpath, using for each repetition one of the plurality of mutually different deposition sequences; and
ii. said simulation of the ME process using for each repetition an activation sequence corresponding to said one respective deposition sequence;
upon establishing said deviation being below said first predetermined threshold, selecting said one respective deposition sequence to obtain a preferred deposition sequence.

6. The method according to claim 3, wherein said performing simulation of said fabrication process in time comprises:
using at least one coefficient indicating a relationship between at least one of said process parameters and the at least one property.

7. The method according to claim 6, wherein said at least one coefficient is at least one of time dependent, anisotropic, and temperature dependent.

8. The method according to claim 6, wherein the determining an adaptation for said at least one property for each element of the mesh model based on said deviation comprises:
for each element of the mesh model determining said adaptation by performing one of:
sign reversing said deviation;
one of sign reversing said at least one coefficient and inverting said at least one coefficient; and storing simulation results for said performing said simulation of the ME process using said activation sequence in reverse order and using said stored simulation results and assigning said deviation resulting from said simulation in reverse order to said adaptation.

9. The method according to claim 8, wherein the reference comprises 3D dimensions of the electronic 3D-model and the deviation comprises a spatial deformation of the 3D dimensions of the mesh model relative to the 3D dimensions of the electronic 3D-model, and wherein for each element of the mesh model said adaptation comprises a spatial compensation; and wherein the applying said adaptation to the generating control instructions comprises:
applying said spatial compensation to said at least one electronic toolpath to obtain at least one spatially compensated electronic toolpath; and
establishing said at least one adapted control instruction comprising said at least one spatially compensated electronic toolpath.

10. The method according to claim 9, wherein the applying said spatial compensation to said at least one electronic toolpath comprises:
applying a coordinate transformation using said ME simulation result to each of said at least one electronic toolpath.

11. The method according to claim 9, wherein the applying said spatial compensation to said at least one electronic toolpath comprises:
applying a coordinate transformation using said ME simulation result to each of the at least one electronic slice to obtain at least one spatially compensated electronic slice;
performing said determining at least one electronic toolpath using each of said at least one spatially compensated electronic slice.

12. The method according to claim 3, wherein the generating control instructions comprises:
generating at least one group of optional electronic toolpaths that are activatable and deactivatable; and
wherein the performing said simulation of the ME process comprises:
for each group of said at least one group of optional electronic toolpaths:
deactivating said respective group of optional electronic toolpaths to obtain a deactivated respective group;
performing simulation of the ME process;
establishing whether said deviation of said simulation of the ME process is higher than a second predetermined threshold;
upon establishing that said deviation is higher than said second predetermined threshold, activating said deactivated respective group.

13. The method according to claim 3, wherein said simulation of the ME process comprises thermo-mechanical simulation using a finite element method.

14. The method according to claim 3, wherein said fabrication process further comprises a post-processing process following the ME process, and wherein said generating control instructions based on said electronic 3D-model and process parameters of said fabrication process comprises:
generating post-processing control instructions for said post-processing process; and
wherein said performing simulation of said fabrication process in time further comprises:

performing simulation of said post-processing process using the ME simulation result and using said post-processing control instructions.

15. The method according to claim 14, wherein said post-processing control instructions comprise annealing process control instructions.

16. The method according to claim 14, wherein the performing simulation of said post-processing process comprises:
   establishing a plurality of mutually different sets of post-processing instructions;
   repeating until said deviation is below a third predetermined threshold:
   i. performing said simulation of the post-processing process using for each repetition one set of said plurality of mutually different sets of post-processing instructions;
   upon establishing said deviation being below said third predetermined threshold, selecting said one respective set of post-processing instructions to obtain a preferred set of post-processing instructions;
   establishing said at least one adapted control instruction comprising said preferred set of post-processing instructions.

17. The method according to claim 1, wherein said performing simulation of said fabrication process in time comprises:
   until said deviation of said at least one property is less than or equal to a fourth predetermined threshold, performing
   i. said simulation of said fabrication process in at least one iteration cycle, using said adapted control instructions from a preceding simulation; and
   ii. applying said adaptation from said iteration cycle to said control instructions.

18. A system for generating adapted control instructions for a material extrusion (ME) process included in a fabrication process of a three-dimensional (3D) object, comprising:
   a processor that is provided with a memory and program instructions, wherein the processor is arranged for:
   performing the steps of the method according to claim 1.

19. A system for fabrication of a three-dimensional (3D) object using a 3D printing material extrusion (ME) process, the system comprising:
   at least one printhead for depositing feedstock material to create the 3D-object;
   a positioning system connected to said printhead, said positioning system being arranged to position said printhead relative to said 3D-object;
   a controller arranged to obtain control instructions and control the positioning system using said control instructions;
   the system further comprising a system for generating adapted control instructions for a material extrusion (ME) process included in a fabrication process of a 3D-object according to claim 18;
   wherein the controller is arranged to obtain adapted control instructions from said system for generating adapted control instructions.

* * * * *